(12) United States Patent
Liu

(10) Patent No.: US 7,817,603 B2
(45) Date of Patent: *Oct. 19, 2010

(54) METHOD AND APPARATUS FOR MULTI-ANTENNA SIGNAL TRANSMISSION IN RF LONG-DISTANCE WIRELESS BS

(75) Inventor: Sheng Liu, 3/F, Legend Building, High Tech Industrial Park, Nanshan District, Shenzhen, Guangdong (CN) 518057

(73) Assignees: Utstarcom Telecom Co., Ltd., Hangzhou (CN); Sheng Liu, Shenzhen (CN)

(*) Notice: Subject to any disclaimer, the term of this patent is extended or adjusted under 35 U.S.C. 154(b) by 944 days.

This patent is subject to a terminal disclaimer.

(21) Appl. No.: 11/587,215

(22) PCT Filed: Apr. 23, 2004

(86) PCT No.: PCT/CN2004/000394

§ 371 (c)(1),
(2), (4) Date: Jan. 19, 2007

(87) PCT Pub. No.: WO2005/104580

PCT Pub. Date: Nov. 3, 2005

(65) Prior Publication Data

US 2007/0160012 A1     Jul. 12, 2007

(51) Int. Cl.
*H04W 4/00* (2009.01)
(52) U.S. Cl. ........................ 370/334; 370/539
(58) Field of Classification Search ................. 370/539, 370/907, 328, 537, 466, 467, 470, 476, 334
See application file for complete search history.

(56) References Cited

U.S. PATENT DOCUMENTS

| | | | |
|---|---|---|---|
| 2003/0058888 A1 | 3/2003 | Shinoda | |
| 2003/0112833 A1 | 6/2003 | Kamiya | |
| 2005/0143131 A1* | 6/2005 | Gish et al. | 455/561 |
| 2005/0216783 A1* | 9/2005 | Sundaram et al. | 714/4 |
| 2005/0220096 A1* | 10/2005 | Friskney et al. | 370/389 |
| 2007/0019653 A1* | 1/2007 | Bolle et al. | 370/395.51 |

FOREIGN PATENT DOCUMENTS

CN            1490987            4/2004

* cited by examiner

*Primary Examiner*—Brian D Nguyen
(74) *Attorney, Agent, or Firm*—Oblon, Spivak, McClelland, Maier & Neustadt, L.L.P.

(57) ABSTRACT

The invention relates to a method for transmitting a plurality of antenna signals in a wireless Base Transceiver Station (BTS) using Remote Radio Head (RRH) technology and the corresponding system. The method includes the steps of: transmitting signals over the transmit channel using Synchronous Digital Hierarchy (SDH)/Optical Transmission Network (OTN), multiplexing the plurality of antenna signals adopting the manners of time division multiplex or GFP frame-level multiplex; forming the multiplexed antenna signal stream and in-band control signaling stream into Generic Framing Procedure (GFP) frame; or forming the plurality of antenna signals and the plurality of respective control signals on the in-band control signaling channel into a plurality of respective GFP frames in parallel; and further mapping the GFP frames to STM-N/OTM-n frames, therefore multiplexing the plurality of antenna signals and the in-band control signaling stream to realize the SDH/OTN-based transmission. According to the invention, in the circumstance of using a plurality of antennas for transmitting signals, the strict time and phase relations between various antenna signals can be ensured, and also system complexity can be simplified, the transmission delays from various antenna signals to CBTS are totally the same.

38 Claims, 19 Drawing Sheets

| PTI = 000 | |
|---|---|
| UPI value | GFP frame payload |
| 0000, 0000, 1111, 1111 | Reserved unused |
| 0000, 0001 | Frame mapping Ethernet MAC |
| 0000, 0010 | Frame mapping PPP |
| 0000, 0011 | Transparent optical fiber channel |
| 0000, 0100 | Transparent FICON |
| 0000, 0101 | Transparent ESCON |
| 0000, 0110 | Transparent GB Ethernet |
| 0000, 0111 | reserved |
| 0000, 1000 | Frame mapping MAPOS |
| 0000, 1001 ~ 1110, 1111 | Reserved for future standard |
| 1111, 000 ~ 1111, 1110 | Reserved for exclusive use |

Fig.4A

| PTI = 100 | |
|---|---|
| UPI value | GFP frame payload |
| 0000, 0000, 1111, 1111 | Reserved unused |
| 0000, 0001 | Client signal failure (lose client signal) |
| 0000, 0010 | Client signal failure (lose client character synchronization) |
| 0000, 0011, 1111, 1110 | Reserved for future use |

Fig. 4B

| Extension Header Identifier (EXI) value | Usage |
|---|---|
| 0000 | Without extension header |
| 0001 | Linear frame |
| 0010 | Ring frame |
| 0011~1111 | Reserved & undefined |

Fig. 5

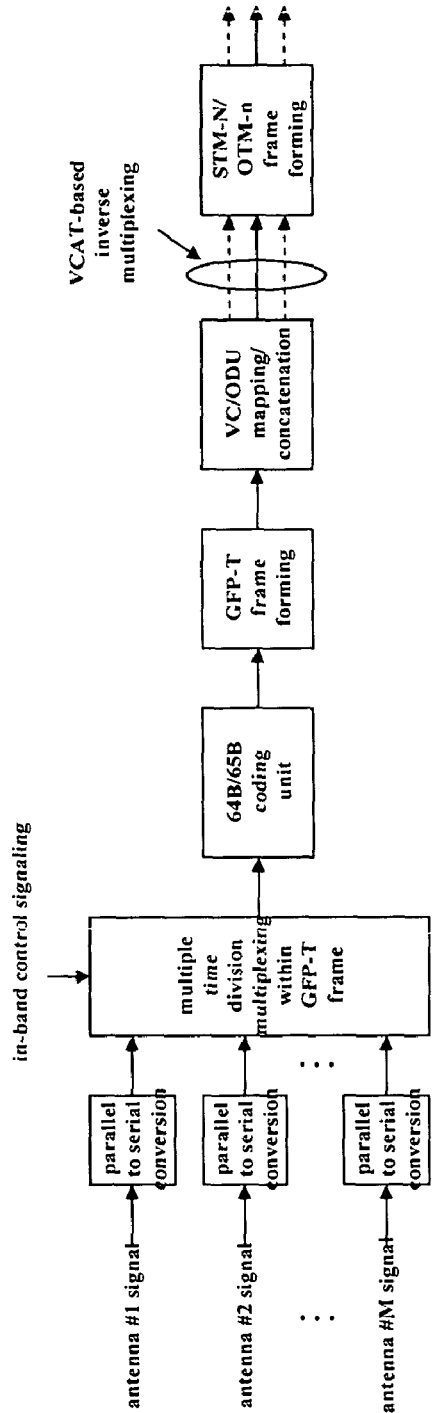
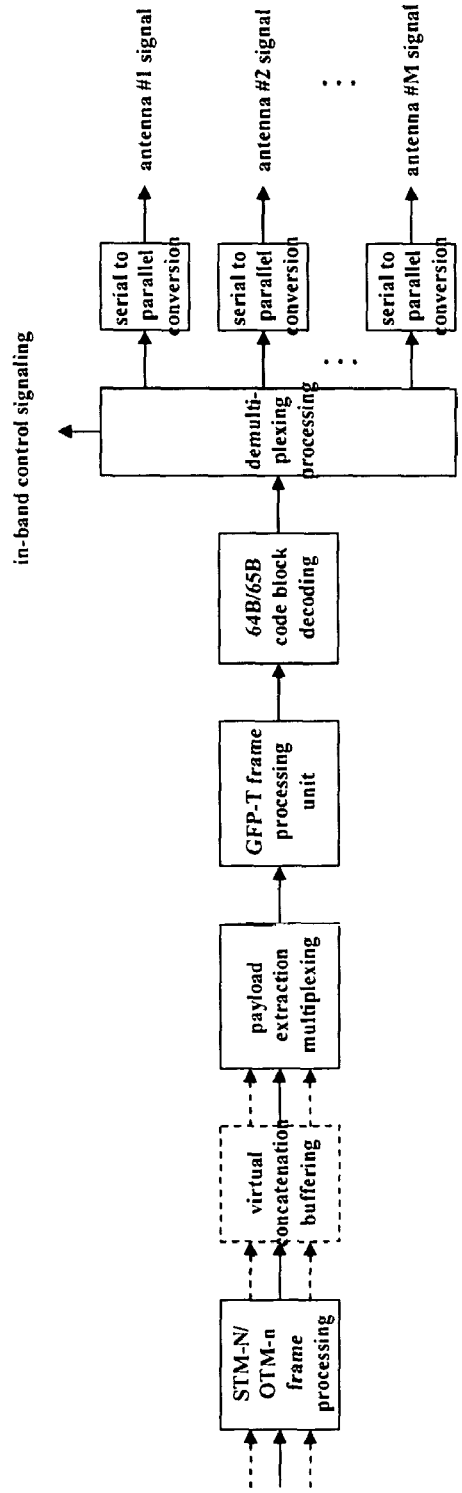
FIG. 8A
FIG. 8B

METHOD AND APPARATUS FOR MULTI-ANTENNA SIGNAL TRANSMISSION IN RF LONG-DISTANCE WIRELESS BS

FIELD OF THE INVENTION

The present invention relates to a Base Transceiver Station technology used in mobile communication system, and more particularly, to a method and corresponding communication system of signal transmission in the Base Transceiver Station system using remote radio head (RRH) technology and multi-antenna technology, wherein the multi-antenna technology includes such technologies as transmit diversity, receive diversity, Multiple-Input Multiple-Output (MIMO) and Smart Antenna or Antenna Array, etc.

BACKGROUND OF THE INVENTION

1. Remote Radio Head technology, Centralized Base Transceiver Station (CBTS) and signal transmission As illustrated in FIG. 1A, in mobile communication systems, a wireless access network is typically composed of Base Transceiver Stations (BTSs) and Base Station Controllers (BSCs) or Radio Network Controllers (RNCs) for controlling a plurality of BTSs. Wherein the BSC is mainly composed of a base band processing subsystem, a radio frequency (RF) subsystem, and antennas etc and is responsible for transmitting, receiving, and processing wireless signal, a BTS can cover various cells by means of a plurality of antennas, as illustrated in FIG. 1B.

In mobile communication systems, there are wireless network coverage problems that are more difficult to be solved with conventional BTS technologies, such as, indoor coverage of high-rise buildings, coverage hole, or the coverage of shadow zone. The RRH technology is a more efficient solution being proposed to solve the above problems. In the BTS system using RRH technology, the primary radio frequency units and antennas are installed in regions that are required to provide coverage, and are connected to other units in the BTS through wideband transmission lines.

This technology can be further developed to a CBTS technology that uses RRH technology. Compared with the conventional BTS, the CBTS using RRH technology has many advantages: the centralized structure allows to use several Micro-Cells to replace a Macro-Cell which is based on the conventional BTS, therefore it can be adapted to various wireless environment better, and enhance wireless performances such as system capacity and coverage etc; the centralized structure enables the replacement of soft handoff in the conventional BTS by softer handoff, therefore obtains additional processing gain; the centralized structure also makes expensive base band signal processing resources become a resource pool shared by several cells, therefore obtains the advantage of Statistic Multiplex, and also decreases system cost. The following patents disclose in detail some implementations about the CBTS using RRH technology, which are U.S. Pat. No. 5,657,374, filed on Mar. 23, 1995, entitled "Cellular system with centralized base stations and distributed antenna units", and U.S. Pat. No. 6,324,391, filed on Jun. 28, 1999, entitled "Cellular communication with centralized control and signal processing", which are hereby incorporated by reference.

As illustrated in FIG. 2, the CBTS system 200 using RRH technology is composed of a central channel processing subsystem 201 and a plurality of Remote Radio Units (RRUs) 2041, 2042, . . . , 204M, which are connected to each other through wideband transmission links or a network. The central channel processing subsystem 201 is mainly composed of a channel processing resource pool 202 and a signal route distribution unit 203, etc. The channel processing resource pool 202 is formed by stacking a plurality of channel processing units 2021, 2022, . . . , 202N together, and is used to perform base band signal processing, etc. The signal route distribution unit 203 dynamically distributes the channel processing resources in accordance with different cell traffics to achieve efficient share of a plurality of cells processing resources. The signal route distribution unit 203 can be constructed as separate equipment outside of the CBTS other than is located inside of the CBTS as illustrated in FIG. 2. The RRUs 2041, 2042, . . . , 204M are mainly composed of functional units such as radio frequency power amplifiers in transmit channel, low noise amplifiers in receive channel, and antennae, etc (not shown entirely). Typically, the links between the central channel processing subsystem 201 and the Remote Radio Units (RRUs) 2041, 2042, . . . , 204M can use transmission media such as optical fiber, copper cable, microwave, etc.

In the two BTS systems using RRH technology discussed above, the key problem to be solved is the wireless signal transmission between the RRUs and the main BTS. The main BTS in the two BTS systems using RRH technology discussed above refers to the generic term of the BTS units including base band processing units other than the radio frequency units. Typically, analog intermediate frequency or analog radio frequency signal transmission scheme is adopted, although it is easier to adopt analog signal transmission scheme, there will introduce disturbing components, for example noise, etc, in analog lines, and the signal modulation in the transmission will also introduce nonlinear distortion. In addition, the analog transmission may decrease the utilization of transmission line, and hamper the implementation of large capacity multiplex technology; therefore, it is difficult to adopt the analog transmission scheme in large scale networking.

To this end, the scheme of digital signal transmission is proposed in the following patent applications: Chinese patent application CN1464666, filed on Jun. 11, 2002, entitled "A soft BTS system based on remote fiber and its synchronization method", and Chinese patent application CN1471331, filed on Jul. 2, 2003 (the priority date being Jul. 2, 2002), entitled "The BTS system in mobile communication". Wherein the scheme of digital base band signal transmission is generally adopted in order to decrease the requirement for transmission band width as much as possible. However, patent application CN1464666 only disclosed the simple method of using the optical fiber to transmit digital I/Q (In-phase/Quadrature) base band signals between the RRU and the main BTS, that is, the digital I/Q base band signals are converted to serial data stream by means of parallel to serial conversion at the transmit end, and then transmitted to the receive end by an optical transmitter, while restored to the digital I/Q base band signals by means of serial to parallel conversion after received by the optical receiver at the receive end. Patent application CN1471331 proposed a transmission technology using Ethernet technology in physical layer, the technology uses continuous bit stream format specially defined instead of Ethernet MAC (Media Access Control) frame. At present, a corporation organization named CPRI (Common public Radio Interface) is also engaged in the standardization of the digital base band transmission between the RRU and the main BTS. This technology specification adopts a technology similar to that adopted in patent application CN1471331, that is, physical interface uses 1000MB or 10GB Ethernet standard, and upper layer uses a continuous bit stream format user-defined. But CPRI only supports star networking in the form of point to point, whereas CN1471331 can support the link converge based on hub.

On the other hand, SDH (Synchronous Digital Hierarchy) and OTN (Optical Transmission Network) based on such Wavelength Division Multiplex technology as DWDM (Dense Wavelength Division Multiplex)/CWDM (Coarse Wavelength Division Multiplexing) have been widely used in backbone network and wideband Metropolitan Area Network (MAN), but the existing technology of digital transmission between the RRU and the main BTS uses specific transport protocols and specification, and therefore, it is difficult to use the existing maturate wideband transmission resources in the existing telecommunication network, so the networking cost is increased. Moreover, there are problems, such as nonflexible networking and complicated maintenance and management, in the existing technology of digital transmission between the RRU and the main BTS.

2. Generic Framing Procedure (GFP)

Generic Framing Procedure (GFP) recommended jointly by ITU-T and ANSI is used to adapt the data stream in the form of block code or packet type to continuous byte synchronization transmission channel, typically for example the new technologies as SDH (Synchronous Digital Hierarchy) and OTN (Optical Transmission Network), the detailed technology specification thereof may refer to ITU-T G.7041 or ANSI T1X1.5/2000-024R3, which are hereby incorporated by reference. GFP can be classified into frame mapping GFP (GFP-F) that supports PDU (Protocol Data Unit) and transparent GFP (GFP-T) that supports block code. The GFP-F can be used in the adaptation of protocol packet as PPP (Point to Point Protocol), MPLS (Multi-Protocol Label Switching), and Ethernet MAC (Media Access Control), etc. And the GFP-T can be used to adapt block code character stream in 1000 MB Ethernet line, etc, directly, thus some application requirements for very little time delay can be satisfied, but the utilization of the GFP-T transmission bandwidth is lower than that of GFP-F transmission bandwidth.

In FIG. 3, a frame structure of GFP-T type is illustrated schematically. As shown in FIG. 3, the GFP-T frame is composed of a core header and a payload part, and the payload part includes a payload header, payload and a selectable payload FCS (Frame Check Sequence, shown by dashed line). The core header includes a PL1 field indicating the payload length and a core header error control field (cHEC); the cHEC is functioned as GFP frame delineation similar to ATM (Asynchronous Transfer Mode) Cell delineation, as well as provides error protection for the core header. The payload header indicates payload types and provides error protection by the cHEC, wherein Payload Type Identifier (PTI) indicates that the GFP-T frame carries user data when it is "000", and indicates that the GFP-T frame carries client management information when it is "100"; payload FCS indicator (PFI) indicates whether there is the payload FCS; User Payload Identifier (UPI) and the PTI together indicate the types of user data or client management information in the payload. More particularly, now referring to FIGS. 4A, 4B, the values of User Payload Identifier (UPI) and the types of user data in GFP frame payload are shown therein, wherein the corresponding relations between the various user data in the GFP frame and the respective PTI when the GFP frame payload carries the user data are defined in FIG. 4A, for example, if PTI=000 and carrying the user data frame, UPI="0000, 0001" indicates frame mapping Ethernet MAC; UPI="0000,0010" indicates frame mapping PPP, etc. Similarly, the corresponding relations between various client management information in the GFP frame and the respective PTI when the GFP frame payload carries the client management information are defined in FIG. 4B, for example, if PTI=100E and carrying the client management frame, UPI="0000, 0001" indicates client signal failure (loss of client signal); UPI="0000, 0010" indicates client signal failure (loss of client character synchronization). Furthermore, in the GFP-T frame payload header, Extension Header Identifier (EXI) indicates the presence of a selectable extension header and its type, GFP Extension Header Identifier defined in the current standard is shown in FIG. 5, wherein EXI="0000" indicates that there is no extension header, EXI="0001" and EXI="0010" are used in the applications of logic point to point (linear) and logic circle link; when EXI="0001", the definition of extension header defined by ITU-T is a little different from that defined by ANSI, wherein ITU-T has defined a channel identifier (CID) of one byte to support multiplexing a plurality of individual client signals (the maximum number being 256), whereas ANSI standard uses the high 4 bits of the byte to indicate destination port, the low 4 bits to indicate source port, the definition of ANSI is the same with that of ITU-T in function and in essence, although the two definitions are different literally. The payload in the GFP-T frame is super block with fixed length which is formed by 64B/65B code block according to certain sequence, as shown in FIG. 3, since the direct adaptation of the transparent GFP now uses block code character stream of a 8B/10B line code, 64B/65B code block includes user data character and control character, so a flag bit is used to indicate whether there is a control character in the 64B/65B code block, wherein the high 4 bits of the control character are used as the subsequent control character indication and the position indication of the control code in the original 8B/10B code stream, and the low 4 bits are used to transmit the control code itself.

3. Virtual Concatenation (VCAT) Technology

The STM-N/OTM-n standard transmission link of SDH/OTN is formed by multiplexing some typical Virtual Containers (VCs) with fixed rate according to certain multiplex rules. For example, the basic VCs of SDH includes VC-11, VC-12, VC-2, VC-3 and VC-4, and VC-4 can form four VCs with higher rate: VC-4-4c, VC-4-16c, VC-4-64c and VC-4-256c by means of sequential concatenation, as illustrated in table 1.

TABLE 1

| VC type | VC bandwidth | VC payload bandwidth |
|---|---|---|
| VC-11 | 1664 Kbit/s | 1600 Kbit/s |
| VC-12 | 2240 Kbit/s | 2176 Kbit/s |
| VC-2 | 6848 Kbit/s | 6784 Kbit/s |
| VC-3 | 48.960 Mbit/s | 48.384 Mbit/s |
| VC-4 | 150.336 Mbit/s | 149.760 Mbit/s |
| VC-4-4c | 601.344 Mbit/s | 599.040 Mbit/s |
| VC-4-16c | 2405.376 Mbit/s | 2396.160 Mbit/s |
| VC-4-64c | 9621.504 Mbit/s | 9584.640 Mbit/s |
| VC-4-256c | 38486.016 Mbit/s | 38338.560 Mbit/s |

The technology of using finite number of fixed rate VCs has simplified SDH multiplex design, and made it easier to realize Add/Drop, multiplex and digital cross connect, but since a plenty of padding are needed to adapt specific VC rate, the transmission efficiency is influenced. Whereas the Virtual Concatenation (VCAT) technology allows for providing more selections on transmission bandwidth by inversely multiplexing a plurality of VCs having the same rate, so the problems with transmission efficiency are solved, but since each VC arrives at the receive end through separate transmission paths, certain buffer is needed at the receive end to eliminate the difference due to transmission delay.

4. The Signal Transmission of Wireless BTS Based on RRH Technology

To solve the problems with wireless signal transmission between the RRU and the main BTS in the existing technology, the applicant of the present application also filed an invention patent application named "A method and system of signal transmission in Base Transceiver Station based on remote radio head". In this application, the invention has proposed a technology of digital wireless signal transmission between the RRU and the main BTS. The proposed digital wireless signal transmission technology is compatible with the existing telecommunication transmission network technology, and can access to the existing SDH/OTN transmission network directly. Because the technology adopts the STM-N/OTM-n standard interface directly, the digital wireless signal transmission between the RRU and the main BTS can be realized without specific transmission network.

According to the patent application, since digital wireless signal data stream and in-band control signaling are mapped to the STM-N/OTM-n frame using the frame structure of transparent GFP (GFP-T), the SDH/OTN-based transmission is realized and the requirement for low transmission delay is satisfied. The in-band control signaling refers to the control, management, operation and maintenance data other than digital wireless signal data stream transmitted between the RRU and the main BTS. According to the patent application, multiple schemes of multiplexing the in-band control signaling and the digital wireless signal data stream are proposed, that is, the scheme of transmitting the in-band control signaling using CMF frame, the scheme of transmitting the in-band control signaling using control character, the multiplex scheme of mapping the in-band control signaling link layer packet to GFP-F frame, the GFP-T frame multiplex scheme of using the in-band control signaling as independent client signal, and the time division multiplex scheme of multiplexing the digital wireless signal data steam and the in-band control signaling, therefore the digital wireless signal data steam and the respective in-band control signaling can be transmitted simultaneously using the same transmit channel. Since the patent application is the extension of GFP-T protocol, most software and hardware designs of GFP-T can be used directly in the implementation, so that the implementation difficult is greatly reduced. This application as a whole is hereby incorporated by reference.

However, this application is mainly aimed at using single antenna, and in practical wireless BTS systems, more and more systems adopt multi-antenna technologies to obtain enhanced wireless performance, typically, such technologies as transmit diversity, receive diversity, Multiple-Input Multiple-Output (MIMO) and Smart Antenna or Antenna Array, etc. In the BTS system using remote radio head (RRH) technology and multi-antenna technology, to ensure strict time/phase relations between various antenna signals, the transmission delays to the CBTS for various signals are required to be the same.

Time delay compensation technology, as the method adopted in CPRI technology specification, requires measuring precisely the time delays of transmission links corresponding to various antennas, and it is only adapted to the networking with fixed time delay, such as point to point link, etc. . . . When intermediate transmission network node is present, the time delay will vary at random because of the vary of network traffic, so time delay measurement and time delay compensation should be performed on the transmission links corresponding to various antennas continuously, in doing so, the system is complicated, and strict time/phase relations between various antenna signals required by the multi-antenna technology are usually hard to be realized.

SUMMARY OF THE INVENTION

To solve the problems present in the wireless signal transmission between the RRU and the main BTS in the existing technology, it is therefore an object of the present invention to provide a method and corresponding system for transmitting a plurality of antenna signals in wireless BTS using RRH technology, which is based on the method and system of signal transmission in Base Transceiver Station based on remote radio head. The effective wireless signal transmission between the RRU and the main BTS can be realized without specific transmission network, and therefore networking cost can be reduced, using the existing bandwidth resource in the existing telecommunication transmission network, especially accessing directly the transmission technology based on SDH/OTN in the existing technology between the RRU and the main BTS, that is, adopting STM-N/OTM-n standard interface directly.

More particularly, another object of the present invention is to provide a method and corresponding system for transmitting a plurality of antenna signals in wireless BTS using RRH technology, under the circumstance of using a plurality of antennas for transmitting, so as to ensure strict time/phase relations between various antenna signals, and enable the transmission delays to the CBTS for various antenna signals to be the same. Typically, according to the method and corresponding system for transmitting a plurality of antenna signals in wireless BTS using RRH technology proposed in the invention, the complexity of the system can be simplified when performing time delay measurement and time delay compensation on the transmission links corresponding to various antennas, so as to ensure strict time/phase relations between various antenna signals under the circumstance of using a plurality of antennas for transmitting.

According to one aspect of the invention, it is provided a method for transmitting a plurality of antenna signals between a main Base Transceiver Station (BTS) and one or more Remote Radio Units (RRUs), wherein the transmit channel between the main BTS and the one or more RRUs communicates using a wideband transmission link or a network, and at least one said RRU communicates the plurality of antenna signals with the main BTS over the transmit channels by using a plurality of antennas, the method comprising the steps of: transmitting over the transmit channel using a Synchronous Digital Hierarchy (SDH)/Optical Transmission Network (OTN); multiplexing the plurality of antenna signals over the transmit channel using time division multiplex; and forming the antenna signal stream multiplexed and an in-band control signaling stream together into a Generic Framing Procedure (GFP) frame, and further mapping the GFP frame to a STM-N/OTM-n frame, thereby multiplexing the plurality of antenna signals and the in-band control signaling stream to realize the SDH/OTN-based transmission.

According to another aspect of the invention, it is provided a method for transmitting a plurality of antenna signals between a main Base Transceiver Station (BTS) and one or more Remote Radio Units (RRUs), wherein the transmit channel between the main BTS and the RRUs communicates using a wideband transmission link or a network, and at least one said RRU communicates the plurality of antenna signals with the main BTS over the transmit channel by using the plurality of antennas, the method comprising the steps of: transmitting over the transmit channel using a Synchronous Digital Hierarchy (SDH)/Optical Transmission Network (OTN); GFP frame-level multiplexing the plurality of antenna signals and an in-band control signaling stream over the transmit channel to form a Generic Framing Procedure (GFP) frame, and mapping the GFP frame to a STM-N/OTM-n frame, thereby multiplexing the plurality of antenna signals and the in-band control signaling stream to realize the SDH/OTN-based transmission.

According to another aspect of the invention, it is provided a method for transmitting a plurality of antenna signals between a main Base Transceiver Station (BTS) and one or more Remote Radio Units (RRUs), wherein the transmit channel between the main BTS and the RRUs communicates using a wideband transmission link or a network, and at least one said RRU communicates a plurality of antenna signals with the main BTS over the transmit channel by using a plurality of antennas, the method comprising the steps of: transmitting the signal over the transmit channel using a Synchronous Digital Hierarchy (SDH)/Optical Transmission Network (OTN); forming the plurality of antenna signals and a plurality of respective control signaling on in-band control signaling channels into a plurality of respective Generic Framing Procedure (GFP) frames in parallel over the transmit channel, and mapping the GFP frames to a plurality of respective STM-N/OTM-n frames, so as to realize the parallel transmission of the plurality of antenna signals based on SDH/OTN.

According to another aspect of the invention, it is provided a BTS communication system for transmitting a plurality of antenna signals between a main Base Transceiver Station (BTS) and one or more Remote Radio Units (RRUs), wherein the transmit channel between the main BTS and the one or more RRUs communicates using a wideband transmission link or a network, and at least one said RRU communicates a plurality of antenna signals with the main BTS over the transmit channel by using a plurality of antennas, the BTS communication system at least comprising: a Synchronous Digital Hierarchy (SDH)/Optical Transmission Network (OTN) communication interface configured on the transmit channel, for multiplexing the plurality of antenna signals over the transmit channel adopting time division multiplex technology; and forming the antenna signals stream multiplexed and in-band control signaling stream into a Generic Framing Procedure (GFP) frame, and further mapping the GFP frame to a STM-N/OTM-n frame, so as to multiplex the plurality of antenna signals and the in-band control signaling stream to realize the SDH/OTN-based transmission.

According to another aspect of the invention, it is provided a BTS communication system for transmitting a plurality of antenna signals between a main Base Transceiver Station (BTS) and one or more Remote Radio Units (RRUs), wherein the transmit channel between the main BTS and the RRUs communicates using a wideband transmission link or a network, and at least one said RRU communicates the plurality of antenna signals with the main BTS over the transmit channel by using a plurality of antennas, the BTS communication system at least comprising: a Synchronous Digital Hierarchy (SDH)/Optical Transmission Network (OTN) communication interface configured on the transmit channel, for forming the plurality of antenna signals and an in-band control signaling stream into a Generic Framing Procedure (GFP) frame over the transmit channel adopting GFP frame level multiplex, and further to map the GFP frame to a STM-N/OTM-n frame, so as to multiplex the plurality of antenna signals and the in-band control signaling stream to realize the transmission based on SDH/OTN.

According to another aspect of the invention, it is provided a BTS communication system for transmitting a plurality of antenna signals between a main Base Transceiver Station (BTS) and one or more Remote Radio Units (RRUs), wherein the transmit channel between the main BTS and the RRUs communicates using a wideband transmission link or a network, and at least one said RRU communicates the plurality of antenna signals with the main BTS over the transmit channel by using a plurality of antennas, the BTS communication system at least comprising: a Synchronous Digital Hierarchy (SDH)/Optical Transmission Network (OTN) communication interface, configured on the transmit channel, for forming the plurality of antenna signals and the plurality of respective control signaling on in-band control signaling channels into a plurality of respective Generic Framing Procedure (GFP) frames in parallel, and for mapping the GFP frames to a plurality of respective STM-N/OTM-n frames, to realize the parallel transmission of a plurality of antenna signals based on SDH/OTN.

BRIEF DESCRIPTION OF THE DRAWINGS

The invention will be better understood when reading the preferred embodiments of the invention in conjunction with accompanying drawings, wherein:

FIGS. 4A, 4B schematically show the data types of GFP frame payload, when the GFP-T frame structure shown in FIG. 3 respectively carries user data and client management frame;

FIG. 5 schematically shows the definition of selectable GFP Extension Header Identifier according to the GFP-T frame structure shown in FIG. 3;

FIGS. 8A, 8B schematically show the SDH/OTN-based transmission between the main BTS and the Remote Radio Unit(s) in accordance with the third embodiment of time division multiplexing a plurality of antenna signals of the present invention;

DESCRIPTION OF THE PREFERRED EMBODIMENTS

Figure 1A:
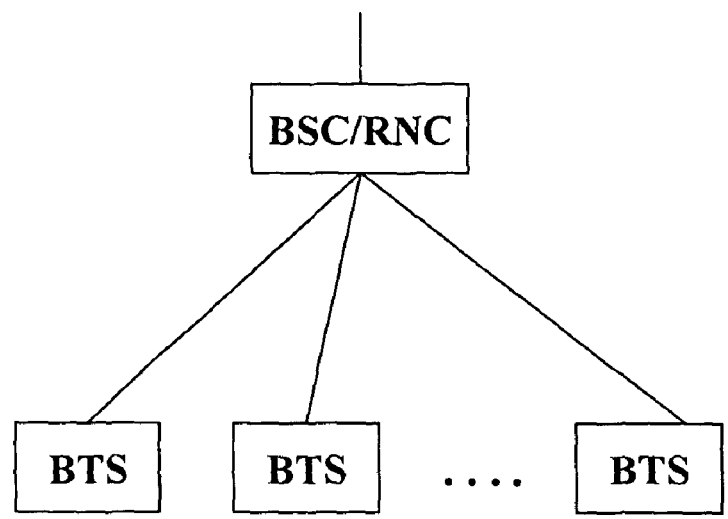
FIG. 1A schematically shows the structure of a wireless access network in a conventional mobile communication system.
Figure 1B:
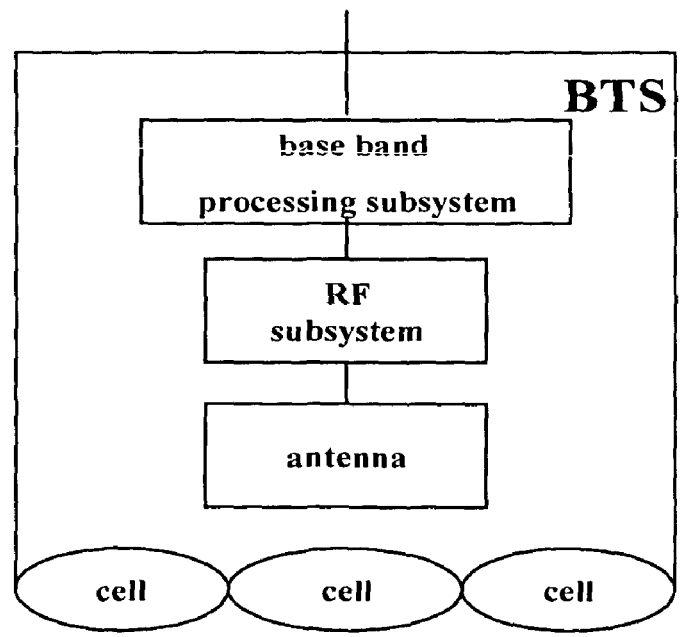
FIG. 1B schematically shows the basic structure of a BTS system in a conventional mobile communication system.
Figure 2:
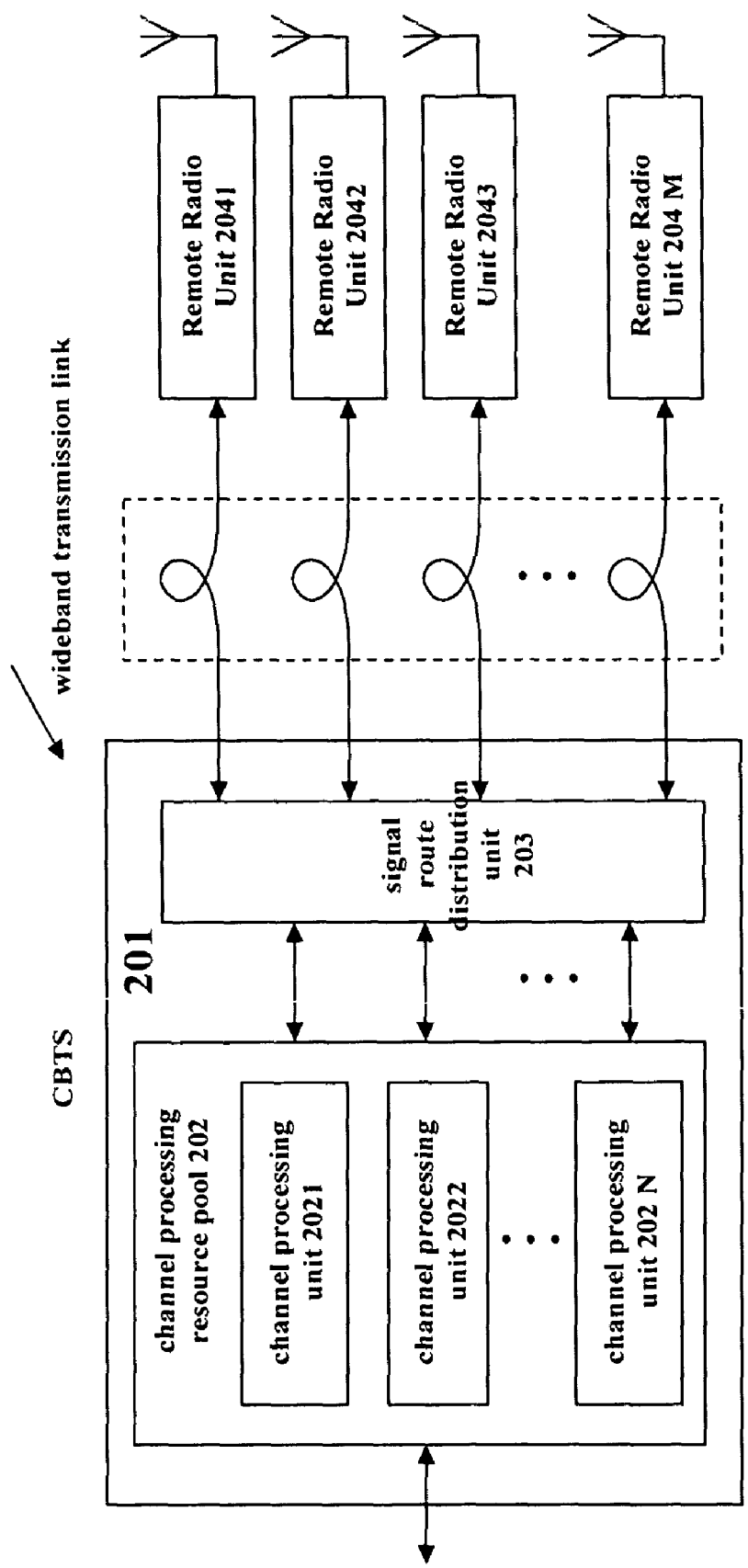
FIG. 2 schematically shows the structure of CBTS system using RRH technology.
Figure 3:
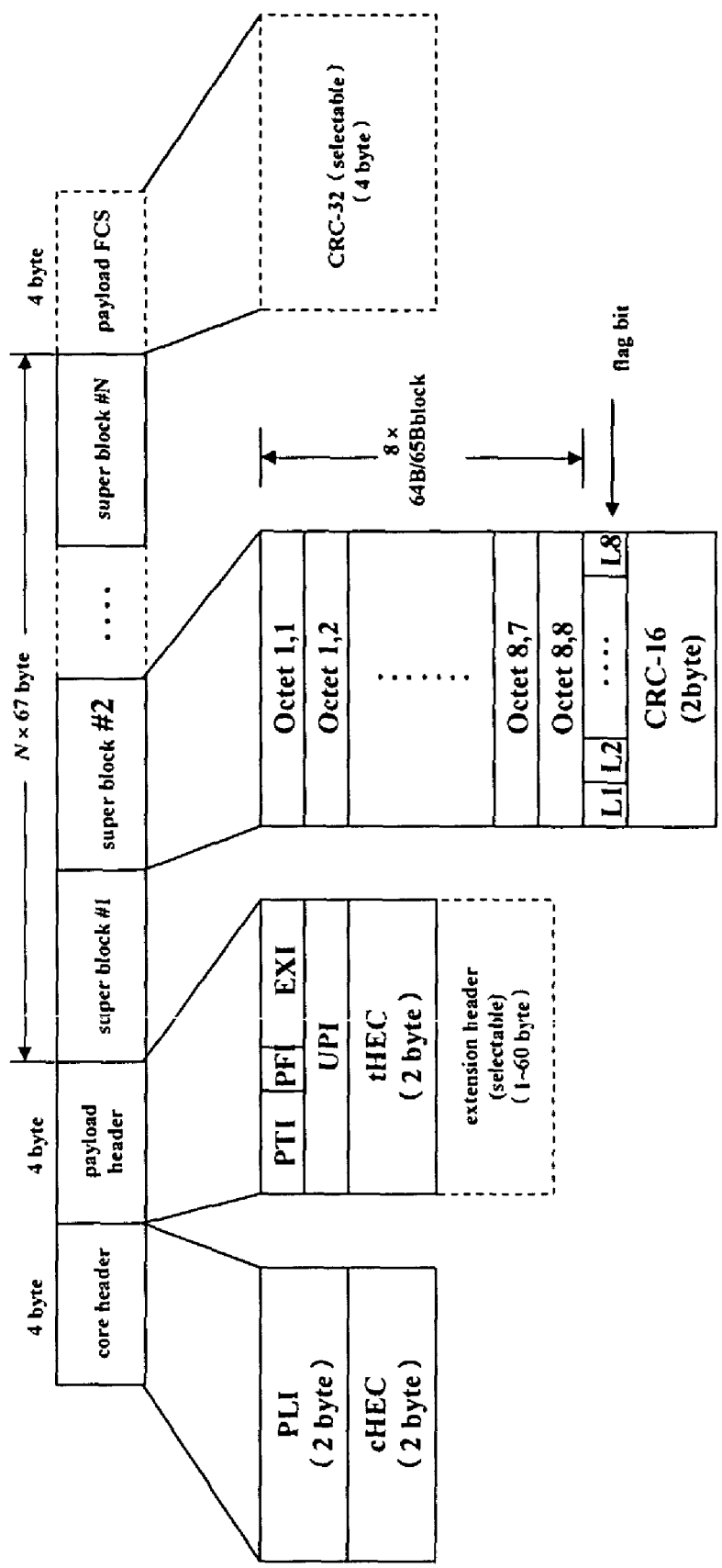
FIG. 3 schematically shows the GFP-T frame structure for block code character stream according to Generic Framing Procedure.

As discussed previously, to solve the above problems with the existing technology, an application is filed with the invention, which is named "A method and system of signal transmission in Base Transceiver Station based on remote radio head", the application proposed a technology of digital wireless signal transmission between the RRU and the main BTS, the technology is compatible with the existing telecommunication transmission network technology, and can utilize the existing SDH/OTN transmission network directly, because the technology adopts the STM-N/OTM-n standard interface directly, the digital wireless signal transmission between the RRU and the main BTS can be realized without specific transmission network.

According to the patent application, since the digital wireless signal data stream and in-band control signaling are mapped to STM-N/OTM-n frame using the frame structure of transparent GFP (GFP-T), the transmission based on SDH/OTN is realized and the requirement for low transmission delay is satisfied, wherein the in-band control signaling refers to the control, management, operation and maintenance data other than digital wireless signal data stream transmitted between the RRU and the main BTS. According to the patent application, multiple schemes of multiplexing the in-band control signaling and the digital wireless signal data stream are proposed, that is, the scheme of transmitting the in-band control signaling using CMF frame, the scheme of transmitting the in-band control signaling using control character, the multiplex scheme of mapping the in-band control signaling link layer packet to GFP-F frame, the GFP-T frame multiplex scheme of using the in-band control signaling as independent client signal, and the time division multiplex scheme of multiplexing the digital wireless signal data steam and the in-band control signaling, therefore the digital wireless signal data steam and the corresponding in-band control signaling can be transmitted simultaneously using the same transmit channel. Since the patent application is the extension of GFP-T protocol, most software and hardware designs of GFP-T can be used directly in implementation, so that the implementation difficult is greatly reduced.

However, the application is mainly aimed at using signal antenna, and in the practical wireless BTS systems, more and more systems adopt multi-antenna technologies to obtain better wireless performance, typically, such technologies as transmit diversity, receive diversity, Multiple-Input Multiple-Output (MIMO) and Smart Antenna or Antenna Array, etc. In the BTS system using remote radio head (RRH) technology and multi-antenna technology, to ensure strict time/phase relations between various antenna signals, the transmission delays to the CBTS for various signals are required to be the same.

Time delay compensation technology, as the method adopted in CPRI technology code, requires that the time delays of transmission links corresponding to various antennas should be measured precisely, and it is only adapted to the network with fixed time delay, such as point to point link, etc. when intermediate transmission network node is present, the time delay will vary at random because of the vary of network traffic, so time delay measurement and time delay compensation should be performed on the transmission links corresponding to various antennas continuously, in doing so, the system is complicated, and strict time/phase relations between various antenna signals required by multi-antenna technology is usually hard to be realized.

To solve the above problems, the invention proposed a method and system of wireless signal transmission in BTS system using RRH technology and multi-antenna technology.

1. Multiplex Transmission Schemes Based on Time Division Multiplexing a Plurality of Antenna Signals FIGS. 6-10 schematically show the SDH/OTN-based transmission between the main BTS and the Remote Radio Unit(s) in accordance with the first to the fifth embodiments of time division multiplexing a plurality of antenna signals of the present invention, respectively. With reference to the structures of transmit end and receive end adopted in the multiplex transmission scheme based on time division multiplexing a plurality of antenna signals, same technology is adopted in the aspect of transmitting the plurality of antenna signals simultaneously: namely, firstly performing parallel to serial conversion on the antenna signals from various antenna branches 1, 2, ..., M; then multiplexing the converted signals to one data stream (digital wireless signal data stream) within each GFP-T frame using isochronous slot time division multiplex technology; finally transmitting the antenna signals from the various branches and the in-band control signaling together through SDH/OTN, in combination with various methods proposed in the application "A method and system of signal transmission in Base Transceiver Station based on remote radio head", which application is also filed by the applicant. Here, for the purpose of simplicity, the technology schemes proposed in the reference application would not be described in detail.

The operation of multiplexing the plurality of antenna signals within one GFP-T frame using isochronous slot time division multiplex technology is performed by: dividing the client signal data block transmitted by each fixed-length GFP-T frame into M slots (sectors) with equal size, then distributing the slots to various antenna branches for transmitting their respective digital wireless signal streams, where M is the number of the antenna branches. The reason for performing time division multiplex within one GFP-T frame is that each GFP-T frame can delimitate the multiplexed data block, so that the digital wireless signal streams corresponding to various antenna branches can be separated and extracted according to predetermined time division multiplex structure.

The embodiments of the invention adopting time division multiplexing a plurality of antenna signals will be further described in combination with the accompanying drawings.

The First Embodiment

Figure 6A:
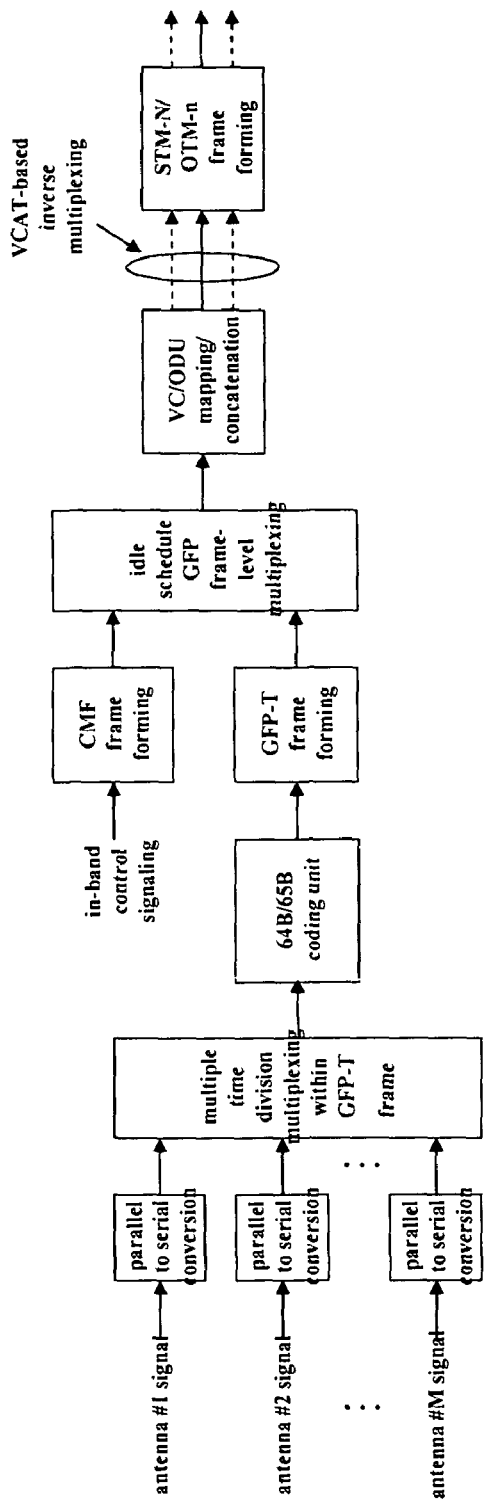
FIGS. 6A, 6B schematically show the SDH/OTN-based transmission between the main BTS and the Remote Radio Unit(s) in accordance with the first embodiment of time division multiplexing a plurality of antenna signals of the present invention.
Figure 6B:
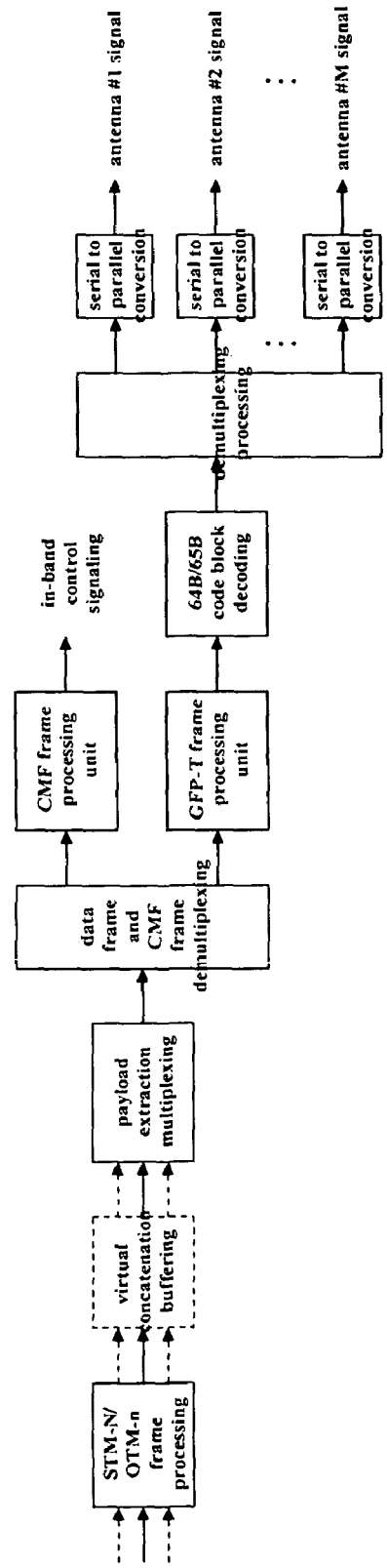

FIGS. 6A, 6B schematically show the SDH/OTN-based transmission between the main BTS and the Remote Radio Unit(s) in accordance with the first embodiment of time division multiplexing a plurality of antenna signals of the present invention.

As shown in FIG. 6A, firstly at the transmit end, parallel to serial conversion is performed on the antenna signals of various antenna branches, such as antenna #1 signal, antenna #2 signal, . . . antenna #M signal, and the converted signals are multiplexed to one signal stream (digital wireless signal data stream) within one GFP-T frame using isochronous slot time division multiplex technology.

Then the digital wireless signal data stream obtained after multiple time division multiplex within the GFP-T frame and an in-band control signaling are transmitted together. Typically, as shown in FIG. 6A, using CMF frame to transmit the in-band control signaling, the in-band control signaling is sent in the manner of a GFP-T Client Management Frame (CMF) (PTI=100), and after proper schedule procedure, the in-band control signaling is transmitted using idle bandwidth in the GFP-T Client Data Frame which transmits the digital wireless signal data stream. Wherein the definitions of UPI=00000001 and UPI=00000010 are the same with those in the existing GFP protocol, i.e. as shown in FIG. 4A-4B, such as link asynchronous, failure, etc, and the UPI of the CMF frame carrying the in-band control signaling may use the reserved values between 00000011 and 11111110, and the in-band control signaling may be disassembled into different control message, and different UPI values can be defined respectively to distinguish them.

The digital wireless signal data stream is mapped to a 64B/65B code block by a 64B/65B coding unit, and then is formed into a GFP-T client data frame. On the other hand, the in-band control signaling stream may also form the CMF frame (also including the defined CMF frame for such indication information as link asynchronous and failure), as discussed previously, if and only if the 65B_PAD padding character is needed, can a single CMF frame be sent at the gap between the client data frames carrying digital wireless signal stream, the multiplexed GFP frame can be mapped to a STM-N/OTM-n frame according to the existing technology, therefore the transmission based on SDH/OTN can be realized. If the SDH transmission is used, the multiplexed GFP frame is mapped to a VC firstly, and then forms the STM-N frame, generally the data rate of the digital wireless signal is much faster than the basic VC rate, so the sequential concatenation or the Virtual Concatenation are needed. As discussed previously, although the bandwidth utilization is higher using the VCAT technology, the transmission delay is increased, so the requirement for the transmission delay in up/down link can not be satisfied in some mobile communication systems adopting rapid power control technology. In OTN, the concatenation manner of ODU (Optical Channel Data Unit) is only VCAT; however, since the ODU rate is very high, the wireless signal transmission between the RRU and the main BTS does not use virtual concatenation ODU.

As illustrated in 6B, at the receive end, the required VC/ODU is separated from the STM-N/OTM-n frame at first (when using the virtual concatenation VC, certain buffer is required to eliminate the delay differences between various VCs transmissions), and the payload GFP frame is extracted, then the CMF frame is separated from the client data frame CFP-T. The in-band control signaling stream is obtained from the CMF frame, while for the client data frame CFP-T, it is decoded by a 64B/65B decoding unit, and then the digital wireless signal data stream corresponding to the transmit end is restored; for the digital wireless signal data stream, it is demultiplexed by a demultiplexing unit to obtain a plurality of signals, then serial to parallel conversion is respectively performed on the plurality of signals by serial to parallel converting units to restore antenna #1 signal, antenna #2 signal, . . . antenna #M signal of the transmit end.

The Second Embodiment

Figures 7A, 7B:
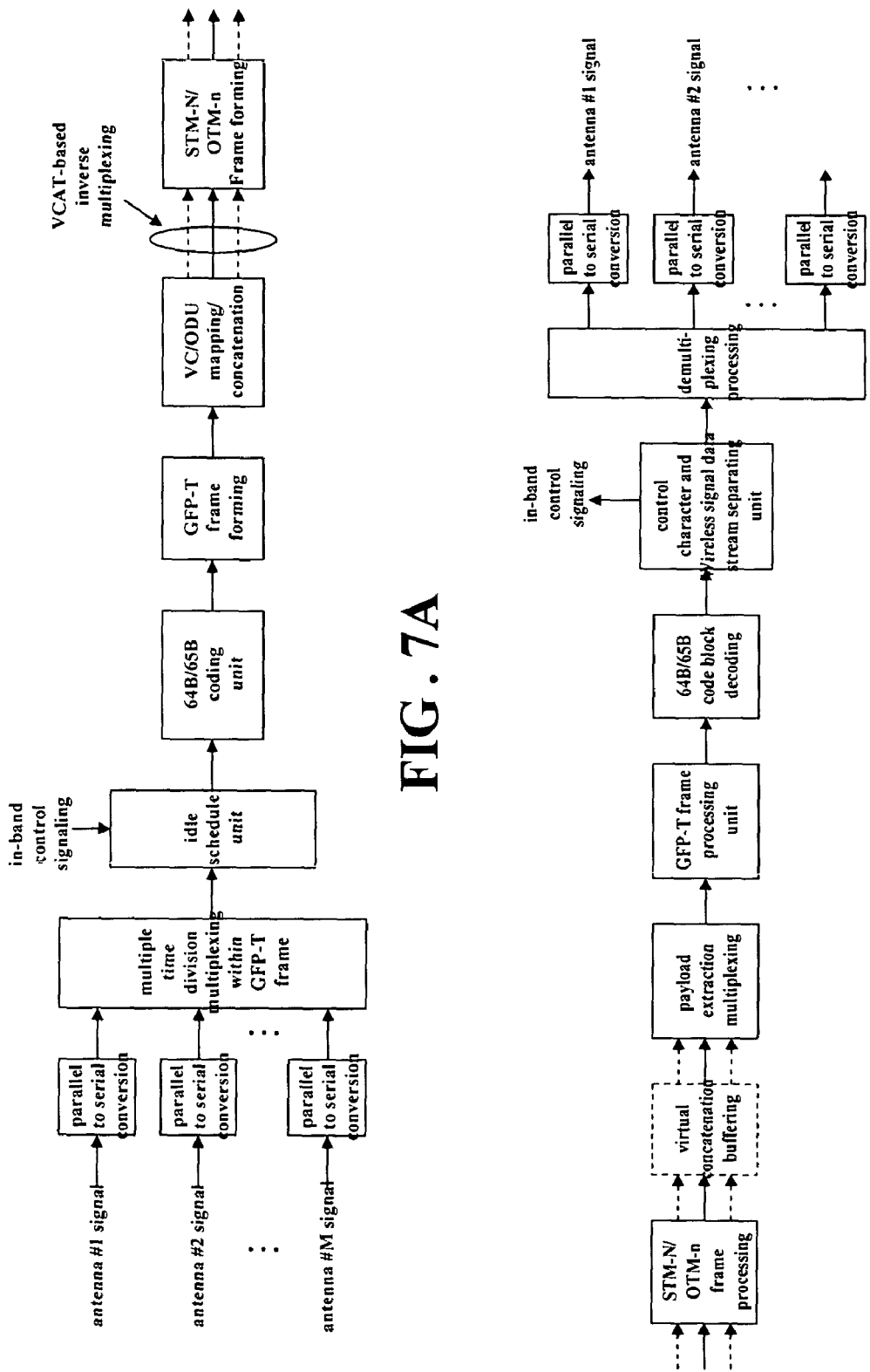
FIGS. 7A, 7B schematically show the SDH/OTN-based transmission between the main BTS and the Remote Radio Unit(s) in accordance with the second embodiment of time division multiplexing a plurality of antenna signals of the present invention.

FIGS. 7A, 7B schematically show the SDH/OTN-based transmission between the main BTS and the Remote Radio Unit(s) in accordance with the second embodiment of time division multiplexing a plurality of antenna signals of the present invention.

As shown in FIG. 7A, firstly at the transmit end, parallel to serial conversion is performed on the antenna signals of various antenna branches, such as antenna #1 signal, antenna #2 signal, . . . antenna #M signal, and the converted signals are multiplexed to one signal stream (digital wireless signal data stream) within one GFP-T frame using isochronous slot time division multiplex technology;

Then the digital wireless signal data stream obtained after multiple time division multiplex within one GFP-T frame and an in-band control signaling are transmitted together. Typically, as shown in FIG. 7A, the in-band control signaling is transmitted using 64B/65B code block control character bit. At the transmit end, the digital wireless signal data stream obtained after multiple time division multiplex within one GFP-T frame is mapped to a 64B/65B code block by a 64B/65B coding unit to form a GFP-T client data frame, and the in-band control signaling stream can enter into the 64B/65B coding unit according to the following schedule procedure: when the digital wireless signal data stream input buffer is close to null, if the in-band control signaling stream input buffer is not null, the in-band control signaling stream enters into the 64B/65B coding unit as a control character, otherwise it is padded by the padding character. The GFP-T frame thus formed is then mapped to a STM-N/OTM-n frame according to the existing technology, to realize the transmission based on SDH/OTN. Similar to the embodiment shown in FIG. 6A, VC/ODC mapping/concatenation is also involved in the process of mapping the GFP-T frame to the STM-N/OTM-n frame.

As shown in FIG. 7B, at the receive end, the required VC/ODU is firstly separated from the STM-N/OTM-n frame (certain buffer is needed to eliminate the delay difference between various VCs transmission), then the payload GFP-T frame is extracted and decoded by a 64B/65B decoding unit, the digital wireless signal data stream corresponding to the transmit end and the in-band control signaling are separated by a separating unit, at last the digital wireless signal data stream is demultiplexed by a demultiplexing processing unit to obtain a plurality of signals, on which serial to parallel conversion is perform by serial to parallel converting units to restore antenna #1 signal, antenna #2 signal, . . . antenna #M signal of the transmit end.

The Third Embodiment

FIGS. 8A, 8B schematically show the SDH/OTN-based transmission between the main BTS and the Remote Radio Unit(s) in accordance with the third embodiment of time division multiplexing a plurality of antenna signals of the present invention.

As shown in FIG. 8A, firstly at the transmit end, parallel to serial conversion is performed on the antenna signals of various antenna branches, such as antenna #1 signal, antenna #2 signal, . . . antenna #M signal, and the converted signals and an in-band control signaling are multiplexed to one signal stream (digital wireless signal data stream) within one GFP-T frame using isochronous slot time division multiplex technology.

Then the digital wireless signal data stream multiplexed is mapped to a 64B/65B code block by a 64B/65B coding unit to form a GFP-T client data frame, and then the GFP-T frame is mapped to a STM-N/OTM-n frame based on the existing technology to realize the transmission based on SDH/OTN. Similar to the embodiment shown in FIG. 6A, VC/ODC mapping/concatenation is also involved in the process of mapping the GFP-T frame to the STM-N/OTM-n frame.

As shown in FIG. 8B, at the receive end, the required VC/ODU is firstly separated from the STM-N/OTM-n frame (certain buffer is needed to eliminate the delay difference between various VCs transmission), then the payload GFP-T frame is extracted and decoded by a 64B/65B decoding unit, and after it is demultiplexed by a demultiplexing processing unit, the in-band control signaling of the transmit end and the plurality of signals corresponding to the antenna signals at the transmit end are obtained, then serial to parallel conversion is performed on the plurality of signals by serial to parallel converting units to restore antenna #1 signal, antenna #2 signal, . . . antenna #M signal of the transmit end.

The Forth Embodiment

Figure 9A:
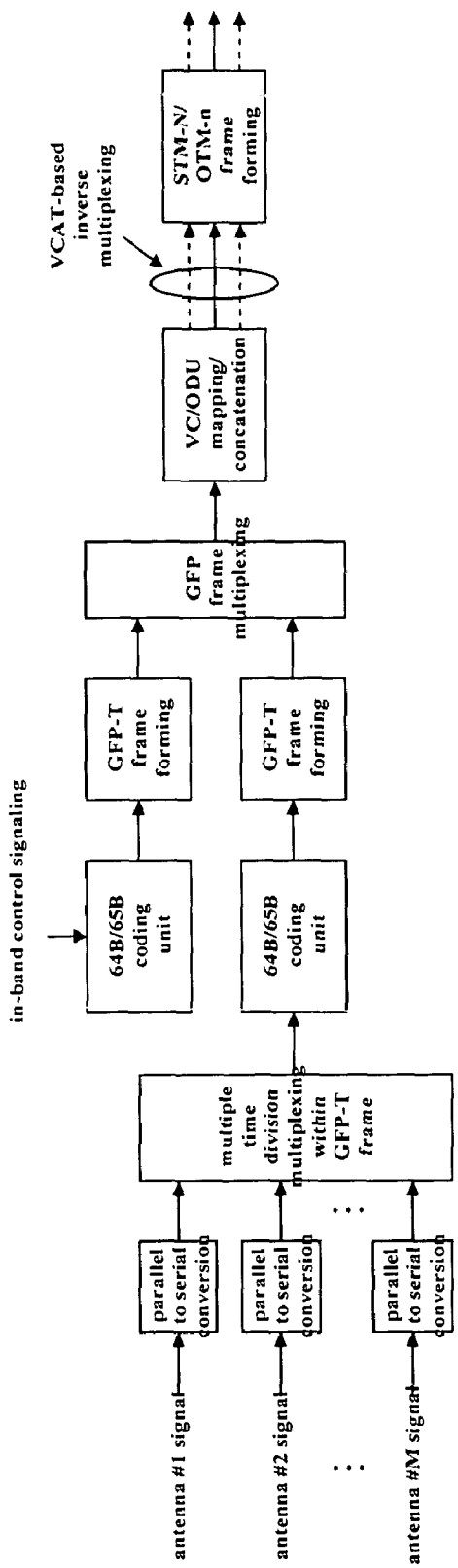
FIGS. 9A, 9B schematically show the SDH/OTN-based transmission between the main BTS and the Remote Radio Unit(s) in accordance with the forth embodiment of time division multiplexing a plurality of antenna signals of the present invention.
Figure 9B:
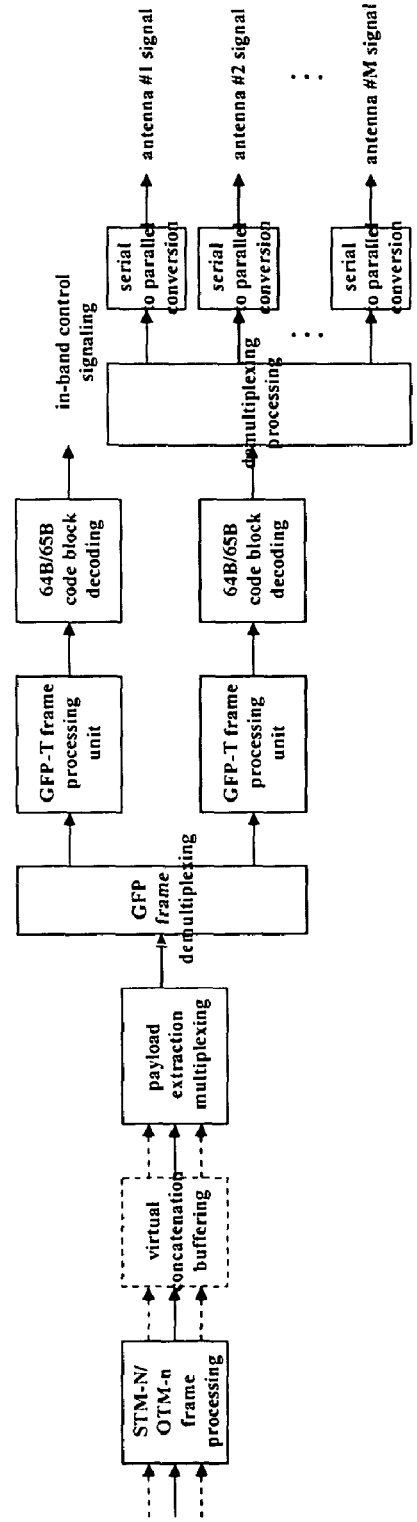

FIGS. 9A, 9B schematically show the SDH/OTN-based transmission between the main BTS and the Remote Radio Unit(s) in accordance with the forth embodiment of time division multiplexing a plurality of antenna signals of the present invention.

As shown in FIG. 9A, firstly at the transmit end, parallel to serial conversion is performed on the antenna signals of various antenna branches, such as antenna #1 signal, antenna #2 signal, . . . antenna #M signal, and the converted signals are multiplexed to one signal stream (digital wireless signal data stream) within one GFP-T frame using isochronous slot time division multiplex technology.

Then the digital wireless signal data stream obtained after multiple time division multiplex within one GFP-T frame and an in-band control signaling is transmitted together. Typically, the digital wireless signal data stream and the in-band control signaling are transmitted simultaneously using GFP frame-level multiplex, and the in-band control signaling acts as another independent client signal GFP frame-level multiplexed with the digital wireless signal data stream. As shown in FIG. 9A, on the one hand, the digital wireless signal data stream is mapped to a 64B/65B code block by a 64B/65B coding unit to form GFP-T client data frame; on the other hand, the in-band control signaling is mapped to a 64B/65B code block by a 64B/65B coding unit to form another GFP-T client data frame. Then the two GFP-T frames are GFP frame-level multiplexed, the GFP frames multiplexed can be mapped to a STM-N/OTM-n frame based on the existing technology to realize the transmission based on SDH/OTN. Similar to the embodiment shown in FIG. 6A, VC/ODC mapping/concatenation is also involved in the process of mapping the GFP frame to the STM-N/OTM-n frame.

As shown in FIG. 9B, at the receive end, the required VC/ODU is firstly separated from the STM-N/OTM-n frame (certain buffer is needed to eliminate the delay difference between various VCs transmission), then the payload GFP frame is extracted and the GFP frame is demultiplexed, on the one hand, the GFP-T frame including the in-band control signaling is separated, and is decoded by a 64B/65B decoding unit to obtain the in-band control signaling of the transmit end; on the other hand, another GFP-T frame including the digital wireless signal data stream corresponding to the transmit end is also obtained, after the GFP frame is demultiplexed, also the digital wireless signal data stream can be obtained after being decoded by a 64B/65B decoding unit, then a plurality of signals are obtained after the signal stream is demultiplexed by a demultiplexing unit, then serial to parallel conversion is performed on the plurality of signals by serial to parallel converting units to restore antenna #1 signal, antenna #2 signal, . . . antenna #M signal of the transmit end.

The Fifth Embodiment

Figures 10A, 10B:
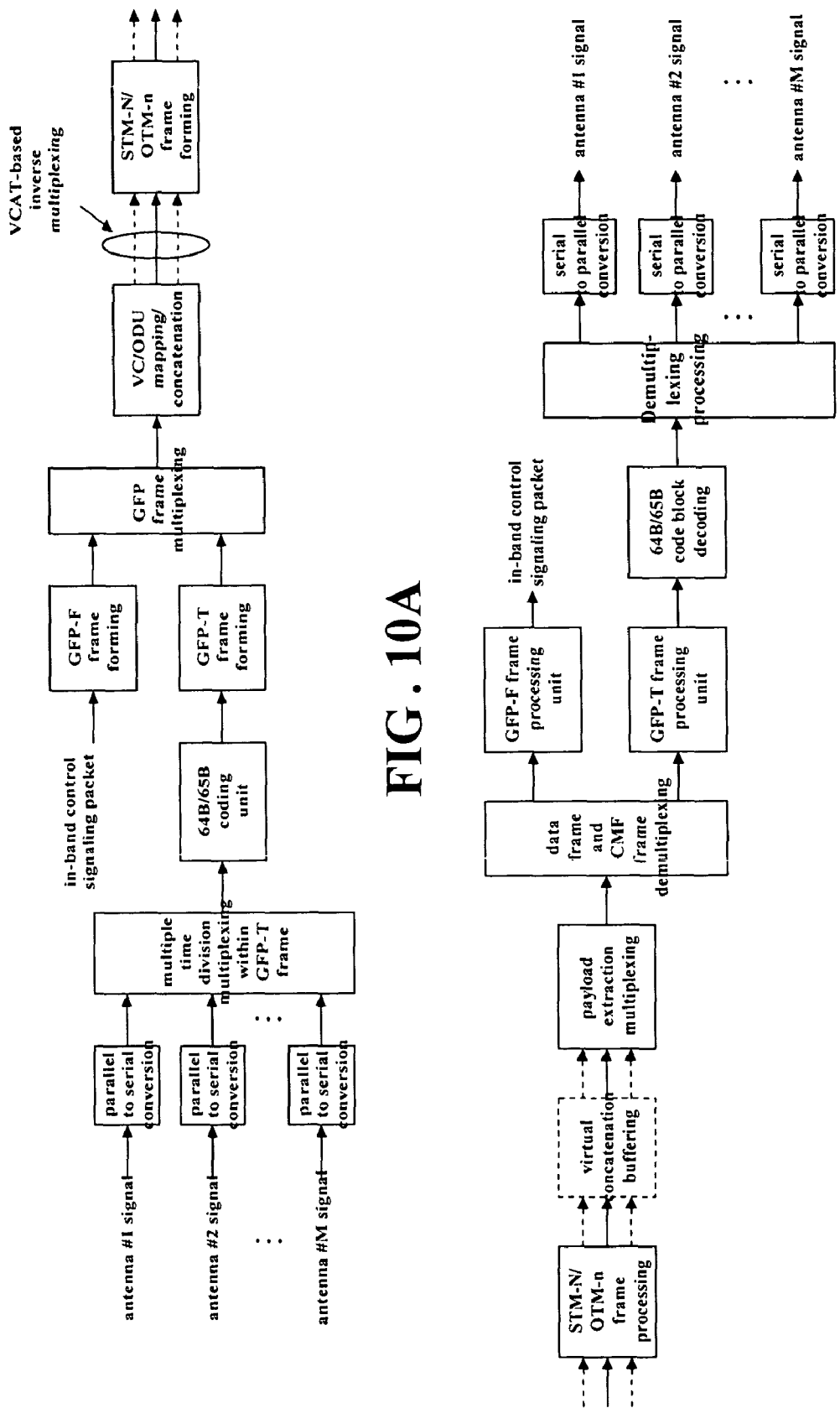
FIGS. 10A, 10B schematically show the SDH/OTN-based transmission between the main BTS and the Remote Radio Unit(s) in accordance with the fifth embodiment of time division multiplexing a plurality of antenna signals of the present invention.

FIGS. 10A, 10B schematically show the SDH/OTN-based transmission between the main BTS and the Remote Radio Unit(s) in accordance with the fifth embodiment of time division multiplexing a plurality of antenna signals of the present invention.

As shown in FIG. 10A, firstly at the transmit end, parallel to serial conversion is performed on the antenna signals of various antenna branches, such as antenna #1 signal, antenna #2 signal, . . . antenna #M signal, and the converted signals are multiplexed to one signal stream (digital wireless signal data stream) within one GFP-T frame using isochronous slot time division multiplex technology.

Then the digital wireless signal data stream obtained after multiple time division multiplex within one GFP-T frame and an in-band control signaling are transmitted together. Typically, the digital wireless signal data stream and the in-band control signaling packet are transmitted simultaneously using GFP frame-level multiplex, as shown in FIG. 10A, the in-band control signaling packet is carried on frame mapping GFP (GFP-F) and acts as another independent client signal that is GFP frame-level multiplexed with the antenna signal stream; and the digital wireless signal data stream is coded by a 64B/65B code block to form another GFP-T frame. Then the two GFP-T frames are GFP frame-level multiplexed, the multiplexed GFP frames can be mapped to a STM-N/OTM-n frame based on the existing technology to realize the transmission based on SDH/OTN. Similar to the embodiment shown in FIG. 6A, VC/ODC mapping/concatenation is also involved in the process of mapping the GFP-T frame to the STM-N/OTM-n frame.

As shown in FIG. 10B, at the receive end, the VC/ODU required is first separated from the STM-N/OTM-n frame (certain buffer is needed to eliminate the delay difference between various VCs transmission), then the payload GFP-T frame is extracted and the GFP frame is demultiplexed, on the one hand, the GFP-F frame including the in-band control signaling is separated to obtain the in-band control signaling packet; on the other hand, another GFP-T frame including the digital wireless signal data stream corresponding to the transmit end is also obtained, after the another GFP frame is demultiplexed, also the digital wireless signal data stream can be obtained after being decoded by a 64B/65B decoding unit, then the plurality of signals are obtained after the signal stream is demultiplexed by a demultiplexing unit, then serial to parallel conversion is performed on the plurality of signals by serial to parallel converting units to restore antenna #1 signal, antenna #2 signal, . . . antenna #M signal of the transmit end.

2. The Transmission Scheme of Multiplexing a Plurality of Antenna Signals Based on GFP Frame Level Multiplex FIGS. 11, 12 schematically show the SDH/OTN-based transmission between the main BTS and the Remote Radio Unit(s) in accordance with the sixth to seventh embodiments of the present invention based on GFP frame-level multiplexing a plurality of antenna signals. The common ground of the two schemes is that the wireless signals from various antenna branches are formed into GFP-T frame by means of parallel to serial conversion and 64B/65B coding processing, then are GFP frame-level multiplexed for transmitting. To ensure strict transmission synchronization of the wireless signals from various antenna branches, the parallel to serial conversion, the 64B/65B coding processing, and the GFP-T frame forming processing corresponding to various antennas are totally synchronized, and the structures and sizes of various GFP-T frames are the same, frame level multiplex adopts the manner of sequential concatenation, that is, the GFP-T frames corresponding to various antenna branches are transmitted in turn and one by one as well.

The difference between the two schemes shown in FIG. 11 and FIG. 12 is in that the schemes of multiplexing the in-band control signaling and the multiplexed digital wireless signal data stream are different, they are: the multiplex scheme of using the in-band control signaling as independent client signal GFP-T frame, which is proposed in the patent application "A method and system of signal transmission in Base Transceiver Station based on remote radio head"; and the multiplex scheme of mapping the in-band control signaling link layer packet to GFP-F frame.

The Sixth Embodiment

Figure 11A:
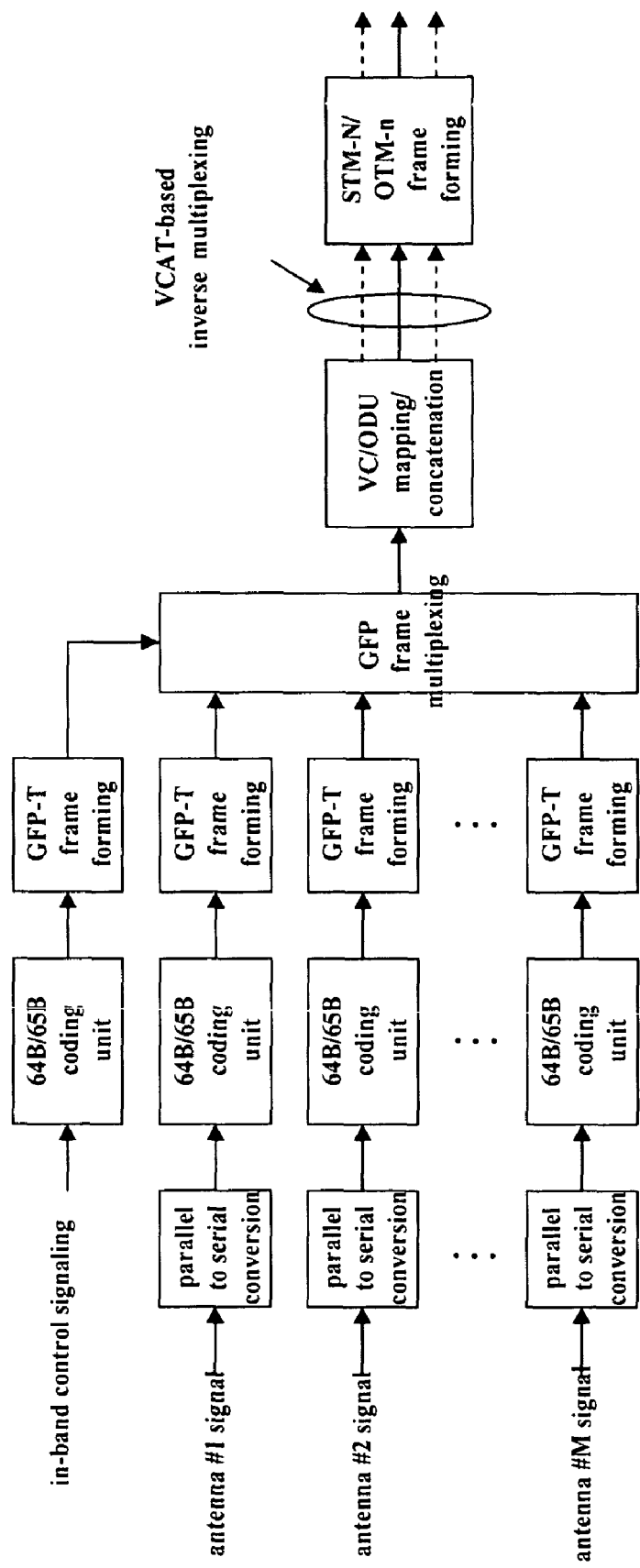
FIGS. 11A, 11B schematically show the SDH/OTN-based transmission between the main BTS and the Remote Radio Unit(s) in accordance with the sixth embodiment of time division multiplexing a plurality of antenna signals of the present invention.
Figure 11B:
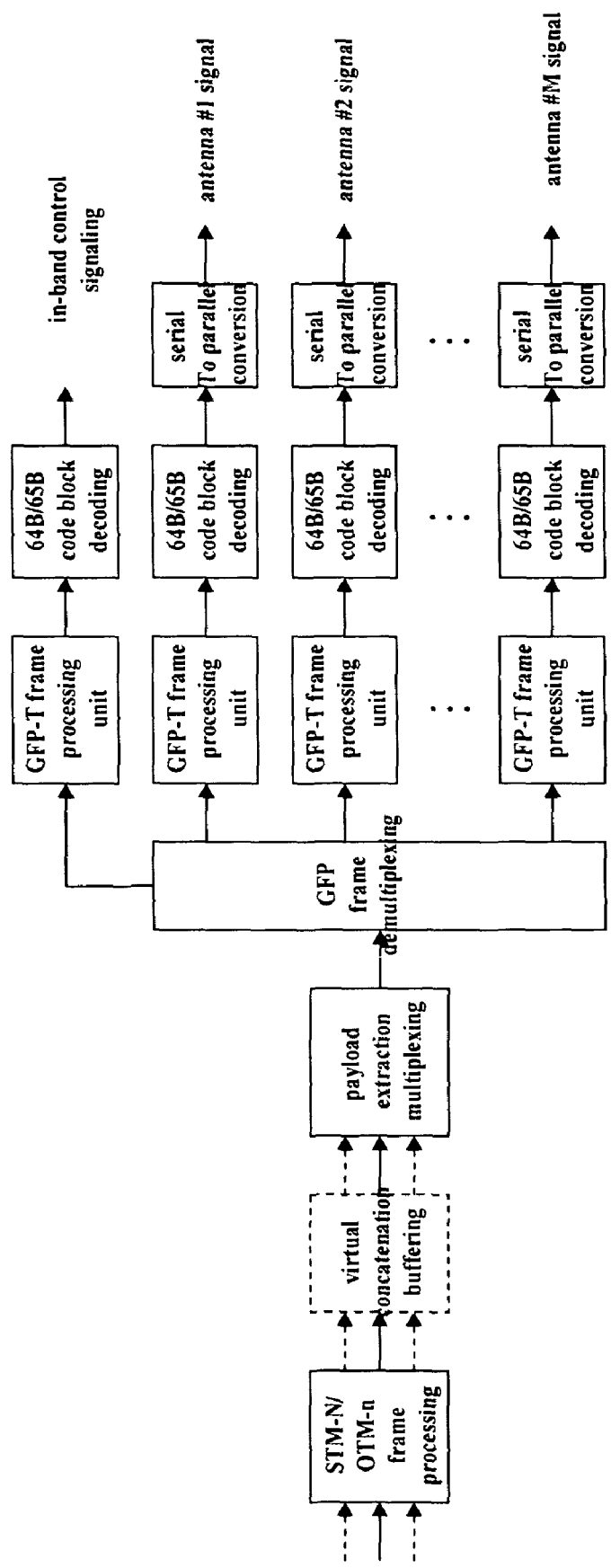

FIGS. 11A, 11B schematically show the SDH/OTN-based transmission between the main BTS and the Remote Radio Unit(s) in accordance with the sixth embodiment of time division multiplexing a plurality of antenna signals of the present invention.

As shown in FIG. 11A, firstly at the transmit end, the antenna signals of various antenna branches, such as antenna #1 signal, antenna #2 signal, . . . antenna #M signal, are formed into M GFP-T frames by means of parallel to serial conversion and a 64B/65B coding processing; on the other hand, the in-band control signaling is mapped to a 64B/65B code block by a 64B/65B coding unit to form another GFP-T client data frame. Then the M GFP-T frames and the another GFP-T frame are GFP frame-level multiplexed, the multiplexed GFP frame can be mapped to STM-N/OTM-n frame based on the existing technology to realize the SDH/OTN-based transmission. Similar to the embodiment shown in FIG. 6A, VC/ODC mapping/concatenation is also involved in the process of mapping the GFP-T frame to the STM-N/OTM-n frame.

As shown in FIG. 11B, at the receive end, the required VC/ODU is firstly separated from the STM-N/OTM-n frame (certain buffer is needed to eliminate the delay difference between various VCs transmission), then the payload GFP frame is extracted and the GFP frame is demultiplexed, on the one hand, the GFP-T frame including the in-band control signaling is separated, and then is decoded by a 64B/65B decoding unit to obtain the in-band control signaling stream; on the other hand, M GFP-T frames corresponding to the M antenna signals of the transmit end are also obtained, after the GFP frame is demultiplexed, also the M GFP-T frames are decoded by 64B/65B decoding units, and are converted by serial to parallel converting units to restore antenna #1 signal, antenna #2 signal, . . . antenna #M signal of the transmit end.

The Seventh Embodiment

Figure 12A:
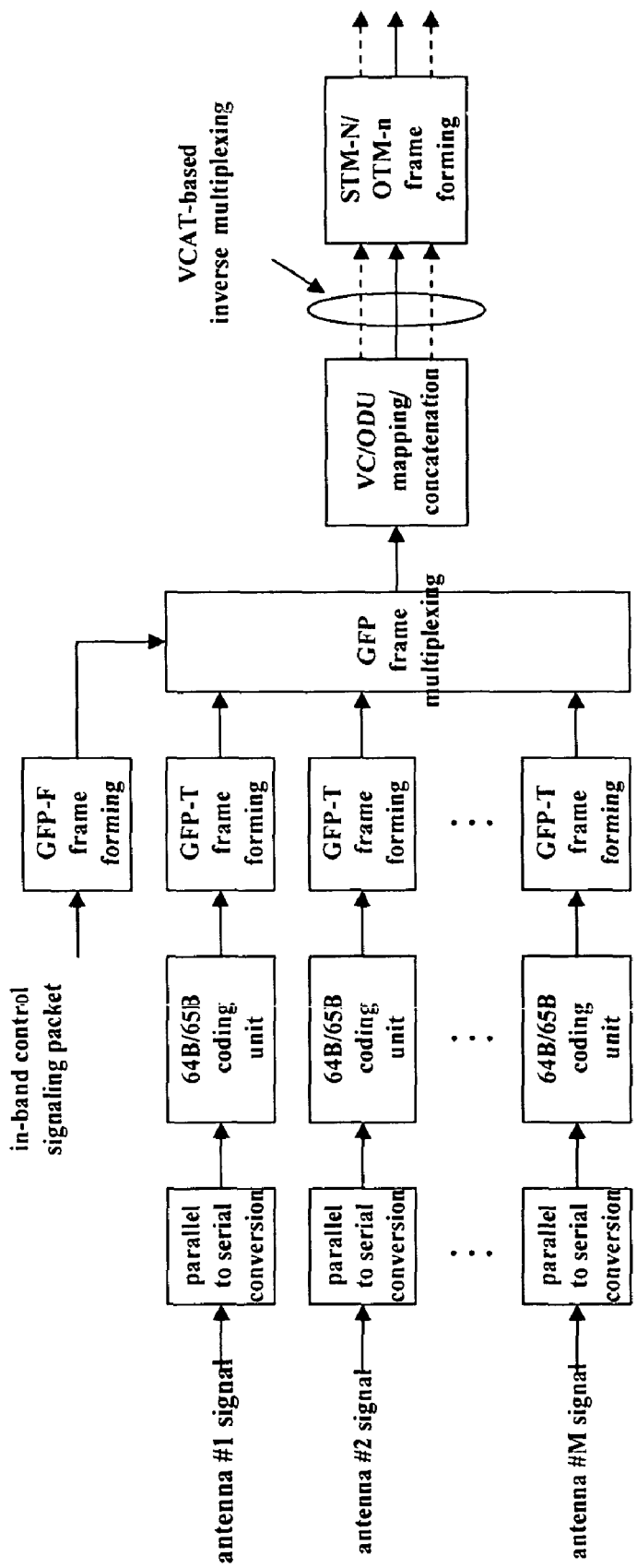
FIGS. 12A, 12B schematically show the SDH/OTN-based transmission between the main BTS and the Remote Radio Unit(s) in accordance with the seventh embodiment of time division multiplexing a plurality of antenna signals of the present invention.
Figure 12B:
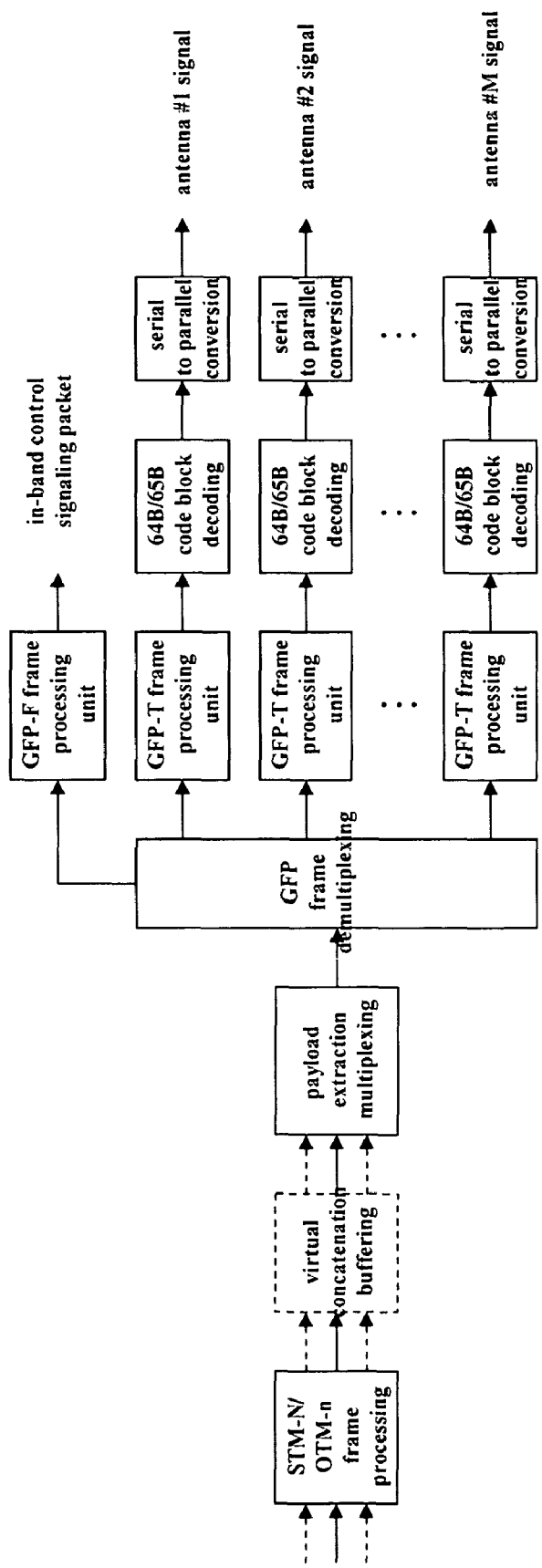

FIGS. 12A, 12B schematically show the SDH/OTN-based transmission between the main BTS and the Remote Radio Unit(s) in accordance with the seventh embodiment of time division multiplexing a plurality of antenna signals of the present invention.

As shown in FIG. 12A, firstly at the transmit end, the antenna signals of various antenna branches, such as antenna #1 signal, antenna #2 signal, . . . antenna #M signal, are formed into M GFP-T frames by means of a parallel to serial conversion and a 64B/65B coding processing: on the other hand, the in-band control signaling packet is carried on frame mapping GFP (GFP-F) and acts as another independent client signal GFP-F frame GFP frame level-multiplexed with the M antenna signals. Then the M GFP-T frames and the GFP-F frame are GFP frame-level multiplexed, the multiplexed GFP frame can be mapped to STM-N/OTM-n frame based on the existing technology to realize the SDH/OTN-based transmission. Similar to the embodiment shown in FIG. 6A, VC/ODC mapping/concatenation is also involved in the process of mapping the GFP-T frame to the STM-N/OTM-n frame.

As shown in FIG. 12B, at the receive end, the required VC/ODU is firstly separated from the STM-N/OTM-n frame (certain buffer is needed to eliminate the delay difference between various VCs transmission), then the payload GFP frame is extracted and the GFP frame is demultiplexed, on the one hand, the GFP-F frame including the in-band control signaling is separated, to obtain the in-band control signaling packet; on the other hand, M GFP-T frames corresponding to the M antennas signals of the transmit end are also obtained, after the GFP frame is demultiplexed, also the M GFP-T frames are decoded by 64B/65B decoding units, and are converted by serial to parallel converting units to restore antenna #1 signal, antenna #2 signal, . . . antenna #M signal of the transmit end.

3. The Scheme of Transmitting a Plurality of Antenna Signals in Parallel Using Multiple Paths The multiplex transmission scheme based on time division multiplexing a plurality of antenna signals and the multiplex transmission scheme based on GFP frame-level multiplexing a plurality of antenna signals apply higher demand on system implementation, because VC/ODU transmission bandwidth is required to increase nearly M times due to multiplex. Although the Virtual Concatenation (VCAT) technology allows for providing more selections on transmission bandwidth by inversely multiplexing a plurality of VCs having the same rate, since each VC arrives at the receive end through separate transmission paths, certain buffer is needed at the receive end to eliminate the difference due to transmission delay, take SDH for example, since the minimum buffer time delay of VCAT is the duration of a STM-N frame, that is, 125 $\mu s$, which will greatly influence the mobile communication system adopting fast power control technology. To this end, other two schemes of transmitting a plurality of antenna signals through multiple paths in parallel are shown in FIGS. 14 and 15, wherein multi-link transmission can be realized.

Figure 14A:
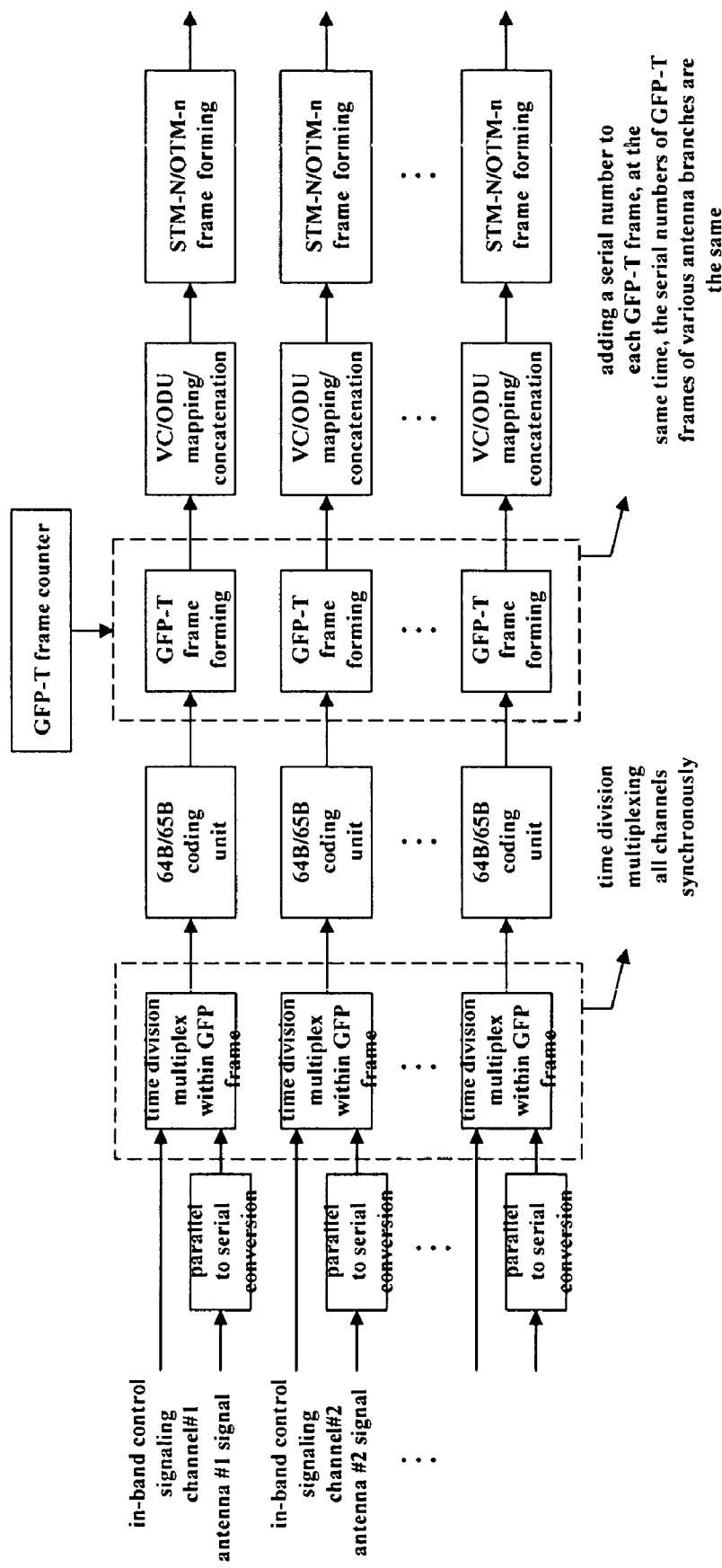
FIGS. 14A, 14B schematically show one scheme of transmitting a plurality of antenna signals in parallel according to the present invention.

As shown in FIG. 14A, parallel to serial conversion is performed on the wireless signals corresponding to various antenna branches, then the converted signals and the data stream on corresponding in-band control signaling channel are multiplexed within one GFP frame, and then are coded by 64B/65B coding units to form GFP-T frames, wherein time division multiplex within one GFP-T frame means to dividing the client signal data block transmitted by each fixed-length GFP-T frame into two slots (sectors) with fixed size, one slot is used to transmit the digital wireless signal data stream corresponding to the antenna branch, another is used to transmit the data stream on the respective in-band control signaling channel, the reason for performing time division multiplex within one GFP-T frame is that each GFP-T frame can delimitate the multiplexed data block, so that the digital wireless signal stream corresponding to each antenna and the data stream on respective in-band control signaling channel can be separated and extracted respectively according to predetermined time division multiplex structure.

To facilitate phrase/time synchronization when transmitting the wireless signals of the various antenna branches, the time division multiplex in GFP-T frames of the various antenna branches should be totally synchronized, that is, the partitioning of the time slots transmitting the wireless signal data streams corresponding to various antenna branches and the data streams on respective in-band control signaling channels should be the same, moreover, the parallel to serial conversion, the 64B/65B coding processing, and the GFP-T frame forming processing corresponding to various antennas are totally synchronized, and the structures and sizes of various GFP-T frames are the same.

Figure 13:
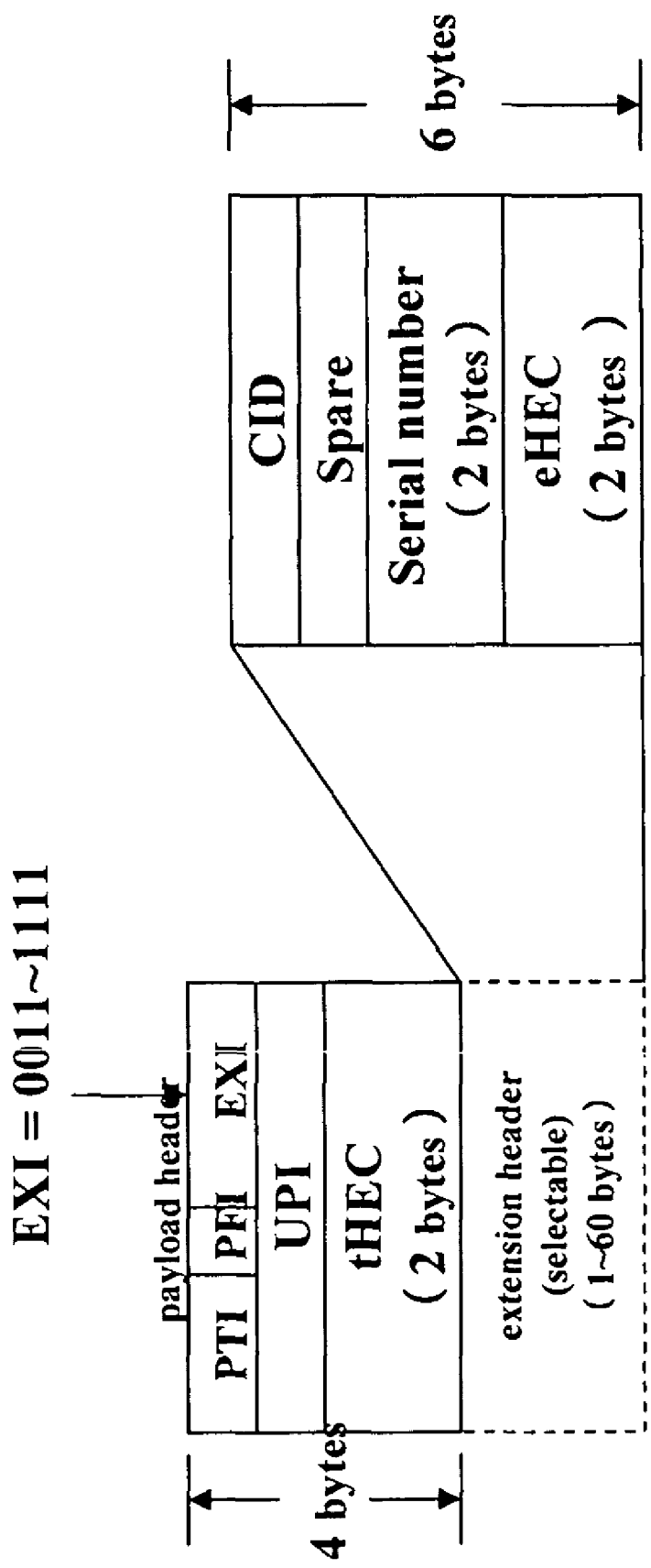
FIG. 13 schematically shows the frame structure of the GFP frame extension header defined in the scheme of transmitting multiple antenna signals in parallel according to the present invention.

In addition, to ensure the synchronization of transmitting the GFP-T frames corresponding to various antennas, the invention proposes a new GFP extension header, as shown in FIG. 13. First of all, to identify the new GFP extension header, a new value of the payload header EXI field can be defined, since the values between 0011-1111 are not used, as an exemplification, EXI=0011 can be defined to indicate that the GFP frame includes the extension header defined in the invention. As shown in FIG. 13, the extension header is mainly composed of a Channel Identifier (CID) of 8 bits, a serial number of 16 bits, and extension header error control field (eHEC), similar to linear frame, CID can support the multiplex of independent client signals, with the maximum number of the client signals being 256, and in the invention CID can be used to identify the GFP-T frames corresponding to different antenna branches; serial number field of 16 bits can be used to count the number of the GFP frames from the same channel, that is, to cycle count every GFP frames from the channel sequentially using addition or subtraction, the serial number field is then used to transmitted the serial number corresponding to each GFP frame. In the invention, the original phrases and time synchronization relations of various antenna wireless signals can be properly restored at the receive end by means of the serial number field.

Figure 14B:
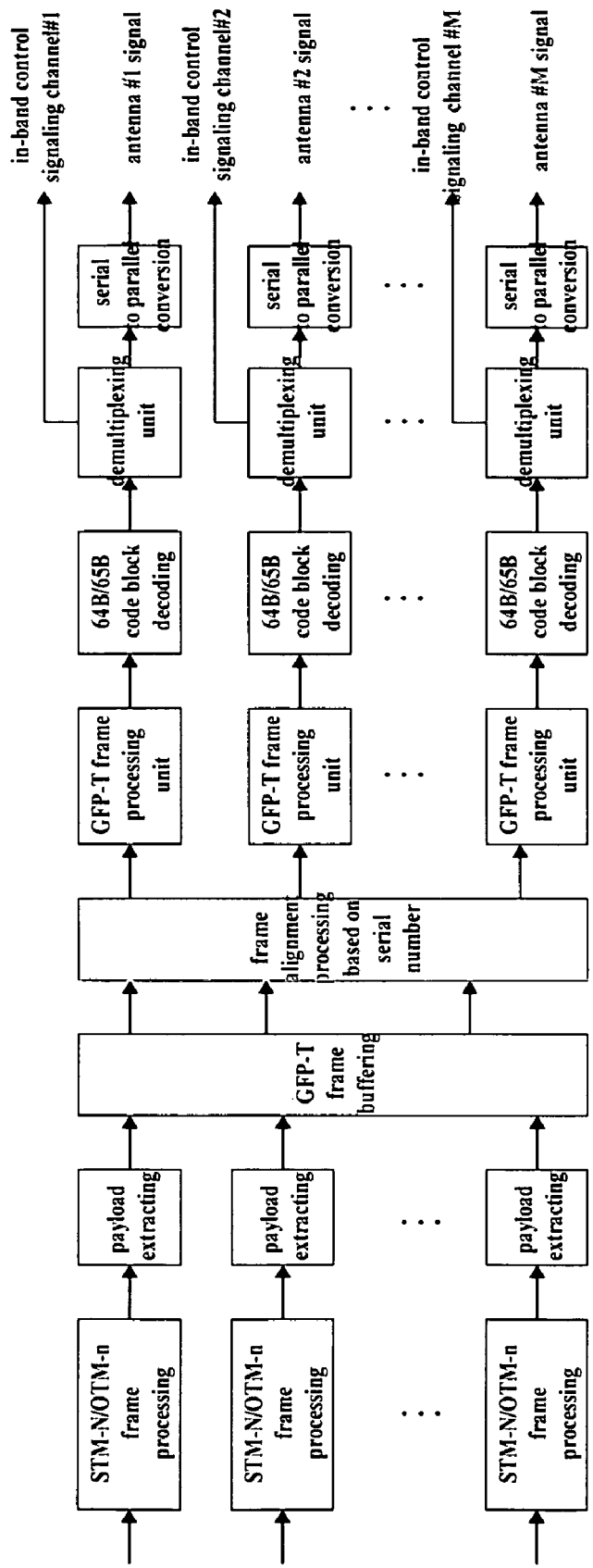

As shown in FIG. 14A, since the parallel to serial conversion, the time division multiplex in a frame, the 64B/65B coding processing, and the GFP-T frame forming processing corresponding to various antennas are totally synchronized, the complete synchronization at GFP-T frame level among various antenna branches can be realized at the transmit end, at this time, write the value of GFP-T frame counter into the serial number fields of the GFP-T frames corresponding to all antenna branches synchronized simultaneously, using the above serial number field of the GFP extension header, then the data streams corresponding to various antenna branches arrive at the receive end through various VC/ODC mapping/concatenations and SDH/OTN transmit channels. As shown in FIG. 14B, at the receive end, at first corresponding to various antenna branches, the required VC/ODUs are separated from the corresponding STM-N/OTM-n frames, and then the GFP-T frames is separated from VC/ODU payloads, then perform GFP-T frame buffering, wherein buffering the GFP-T frames corresponding to the various antenna branches is to perform GFP frame alignment processing based on serial number so as to restore the original phrases and time synchronization relations of various antenna wireless signals. After the GFP frame alignment processing based on serial number, each branch goes through respective GFP-T frame processing unit, 64B/65B code block decoding unit, demultiplexing unit, and serial to parallel converting unit respectively to restore the digital wireless signal data stream corresponding to respective antenna branch which still maintain the original phrase and time synchronization relation, and the data stream on the respective in-band control signaling channel, likely, the processes of the GFP-T frame processing unit, the 64B/65B code block decoding unit, the demultiplexing unit, and the serial to parallel converting unit are also synchronized.

Another scheme of transmitting a plurality of antenna signals through multiple paths in parallel shown in FIG. 15 also adopts the same technology based on GFP frame serial number alignment processing, to ensure the synchronization of the digital wireless signal data streams corresponding to various antenna branches. Different with FIG. 14, in this scheme, the multiplex of the digital wireless signal data streams corresponding to the various antenna branches and the data stream on respective in-band control signaling channel adopts the multiplex method of taking the latter as an independent client signal GFP-T frame, instead of multiplex within one GFP frame.

Figure 15A:
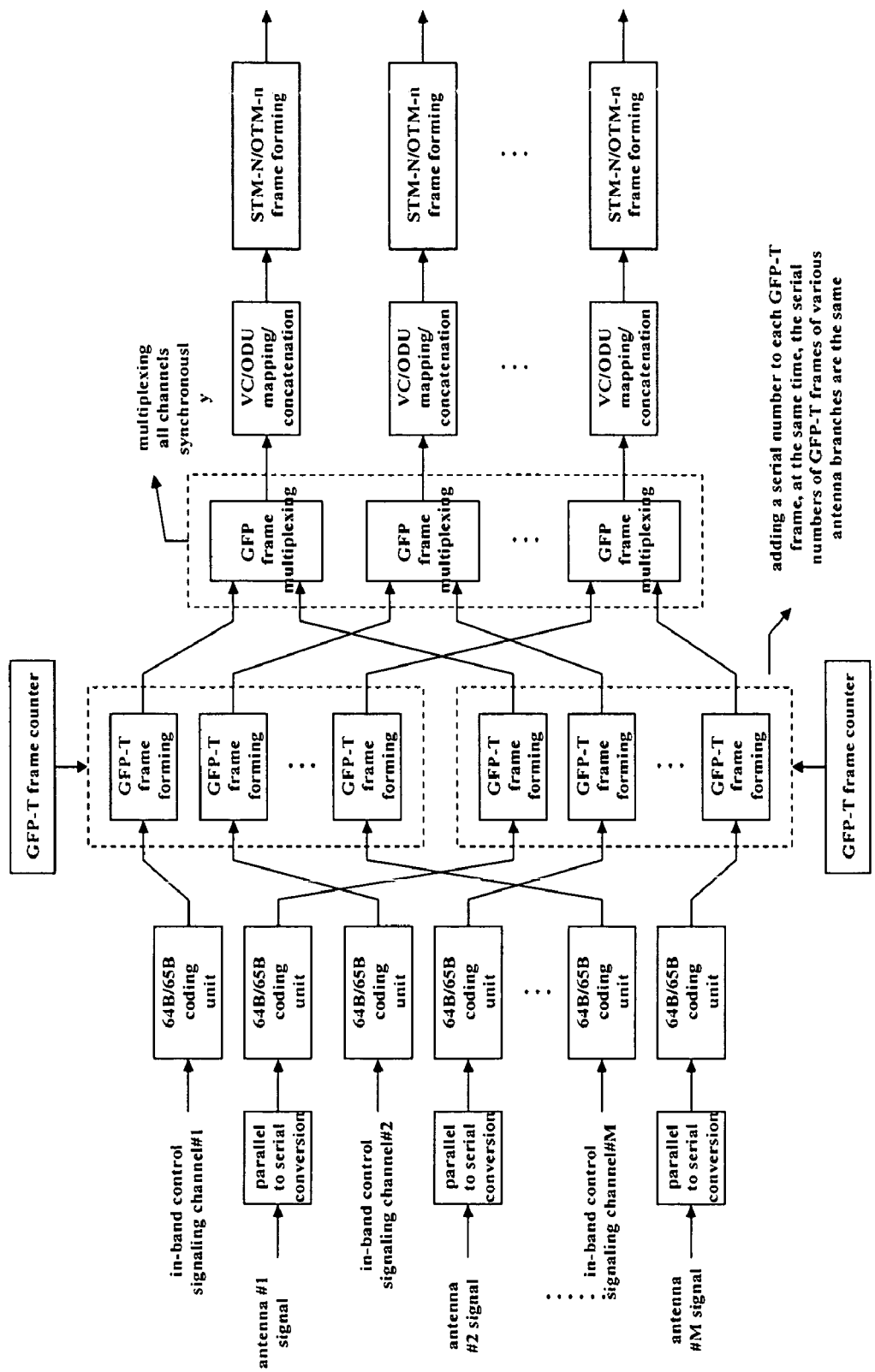
FIGS. 15A, 15B schematically show another scheme of transmitting a plurality of antenna signals in parallel according to the present invention.
Figure 15B:
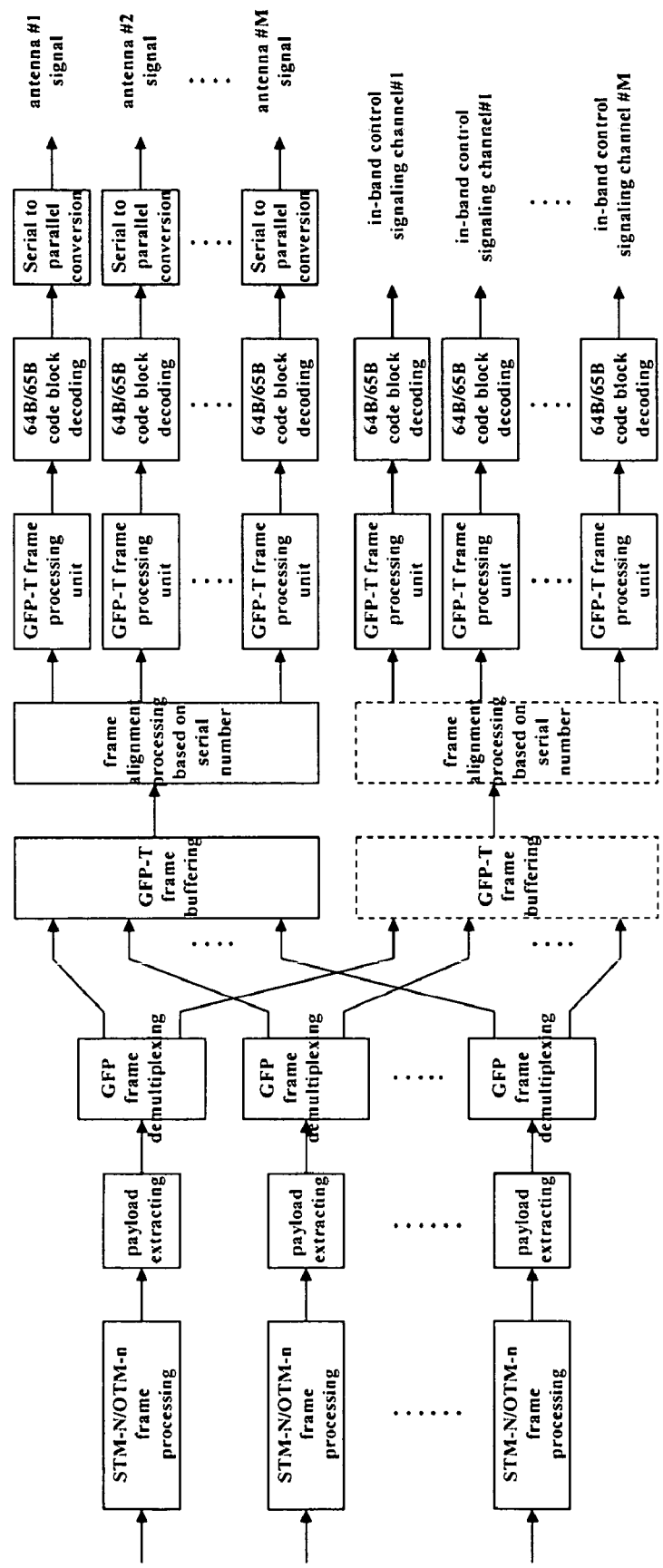

To facilitate the phrase and time synchronization when transmitting the wireless signals corresponding to various antenna branches, the units ahead of the GFP multiplex unit shown in FIG. 15A and the units after the GFP frame serial number alignment processing unit shown in FIG. 15B are totally synchronized. GFP frame-level multiplex adopts the manner of distributing and scheduling fixed bandwidth, that is, a corresponding GFP-T frame on the in-band control signaling channel is transmitted, when every N ($N \geq 1$) digital wireless signal GFP-T frames from certain antenna branches are transmitted, if the input buffer corresponding to certain antenna branch is null, it is padded with padding character. Also, to ensure synchronized transmission, the bandwidth distributing manner of various GFP frame multiplex units, the structures and sizes of GFP-T frames are all the same.

It should be noted that, the GFP-T frame serial number alignment processing performed on the data stream on the in-band control signaling channel is selectable; it depends on the usage of the in-band control signaling channel and the capability of the link layer supporting inverse multiplex. Typically, in the two schemes of transmitting a plurality of antenna signals through multiple paths in parallel, the in-band control signaling channel may have three possible usages: (1) the in-band control signaling packets are transmitted independently through the corresponding in-band control signaling channels, so that the in-band control signaling channels equal to a plurality of independent in-band control signaling channels for Upper Layer Protocol; (2) the data streams corresponding to various channels are converged to one data stream by means of transmission layer synchronization, so that the in-band control signaling channels are one in-band control signaling transmit channel for Upper Layer Protocol; (3) the in-band control signaling channels provide a single logic link for Upper Layer Protocol using the link layer protocols having the function of inverse multiplexing logic link, such as Multi-link PPP, IEEE 802.3ad Link Aggregation Control Protocol, Inverse Multiplex ATM (IMA), etc, without the requirement for transmission layer synchronization.

The scheme of transmitting a plurality of antenna signals through multiple paths in parallel shown in FIG. 14, can adopt the in-band control signaling channel usages provided in (1) or (2), because the transmission layer has realized the synchronization among various in-band control signaling channels; the scheme of transmitting a plurality of antenna signals through multiple paths in parallel shown in FIG. 15, can adopt the in-band control signaling channel usages provided in (1) or (2), if the GFP-T frame serial number alignment processing is performed on the data streams on the in-band control signaling channels at the receive/transmit end; otherwise, the scheme can adopt the in-band control signaling channel usages provided in (1) or (3).

The method and system of the wireless BTS signal transmission based on the RRH are disclosed above in conjunction with the accompanying drawings, but the disclosures are not intended to limit the invention. Those skilled in the art will recognize that various modifications and improvements may be made to the invention according to the principle of the invention, without departing from the scope of the appended claims of the invention.

What is claimed is:

1. A method for transmitting a plurality of antenna signals between a main Base Transceiver Station (BTS) and one or more Remote Radio Units (RRUs), wherein a transmit channel between the main BTS and the one or more RRUs communicates using a wideband transmission link or a network, and at least one of said RRUs communicates the plurality of antenna signals with the main BTS over the transmit channel by using a plurality of antennas, the method comprising the steps of:

at a transmit end:
transmitting over the transmit channel using a Synchronous Digital Hierarchy (SDH)/Optical Transmission Network (OTN);
multiplexing the plurality of antenna signals over the transmit channel using time division multiplex; and
forming a multiplexed antenna signal stream and an in-band control signaling stream together into a Generic Framing Procedure (GFP) frame, and further mapping the GEP frame to a STM-N/OTM-n frame, thereby multiplexing the plurality of antenna signals and the in-band control signaling stream to realize SDH/OTN-based transmission.

2. The method for transmitting a plurality of antenna signals of claim 1, wherein the method further includes:
at the transmit end:
performing parallel to serial conversion on the plurality of antenna signals respectively; and
forming the plurality of antenna signals converted into one digital wireless signal data stream using isochronous slot time division multiplex technology within one GFP-T frame, wherein the operation of isochronous slot time division multiplexing the plurality of antenna signals within one GFP-T frame refers to dividing a client signal data block transmitted by each GFP-T frame with fixed length into M time slots with equal size, and distributing the time slots to various antenna branches respectively to transmit the digital wireless signal stream thereof, where M is the number of the antenna branches, and the GFP-T frame is the frame supporting block code as defined by Generic Framing Procedure.

3. The method for transmitting a plurality of antenna signals of claim 2, wherein the method further includes:
at a receive end:
demultiplexing the received digital wireless signal data stream; and
performing serial to parallel conversion on a plurality of demultiplexed signals to restore the plurality of antenna signals.

4. The method for transmitting a plurality of antenna signals of claim 2, wherein the method further includes:
at the transmit end:
coding the digital wireless signal data stream and forming the coded data stream into a GFP-T client data frame;
forming the in-band control signaling stream into a GFP-T Client Management Frame(CMF);
transmitting a single CMF at a gap between the formed GFP-T client data frames, so as to GFP frame-level multiplex the digital wireless signal data stream and the in-band control signaling stream; and
at a receive end:
extracting the GFP frame from a received STM-N/OTM-n frame;
demultiplexing the extracted GFP frame to separate the GFP-T client data frame and the GFP-T Client Management Frame (CMF), so as to restore the in-band control signaling from the separated GFP-T Client Management Frame, and to decode the separated GFP-T client data frame firstly and to restore the digital wireless signal data stream thereafter.

5. The method for transmitting a plurality of antenna signals of claim 4, wherein the multiplexed GFP frame is firstly mapped to a Virtual Container (VC) and then to a STM-N frame by means of sequential concatenation or virtual concatenation; or the multiplexed GFP frame is directly mapped to an OTM-n frame using an Optical Channel Data Unit (ODU); and
correspondingly, performing virtual concatenation buffering on the received STM-N/OTM-n frame.

6. The method for transmitting a plurality of antenna signals of claim 2, wherein
at the transmit end:
coding the digital wireless signal data stream;
transmitting the in-band control signaling utilizing a control character in a code block used in a coding processing;
forming the coded digital wireless signal data stream with the in-band control signaling into a GFP-T frame; and
at a receive end:
extracting the GFP-T frame from a received STM-N/OTM-n frame;
decoding the extracted GFP-T frame; and
restoring the in-band control signaling and the digital wireless signal data stream from the decoded GFP-T frame.

7. The method for transmitting a plurality of antenna signals of claim 6, wherein the GFP-T frame is firstly mapped to a Virtual Container (VC) and then to a STM-N frame by means of sequential concatenation or virtual concatenation; or the GFP-T frame is directly mapped to an OTM-n frame using an Optical Channel Data Unit (ODU); and
correspondingly, performing virtual concatenation buffering on the received STM-N/OTM-n frame.

8. The method for transmitting a plurality of antenna signals of claim 2, wherein
at the transmit end:
time division multiplexing the digital wireless signal data stream and the in-band control signaling stream within one GFP-T frame;
coding the data stream obtained after being time division multiplexed and forming a GFP-T client data frame; and
at a receive end:
extracting the GFP-T frame from a received STM-N/OTM-n frame;
decoding the extracted GFP-T frame; and
demultiplexing the decoded GFP-T frame to restore the in-band control signaling and the digital wireless signal data stream.

9. The method for transmitting a plurality of antenna signals of claim 8, wherein the GFP-T frame is firstly mapped to a Virtual Container (VC) and then to a STM-N frame by means of sequential concatenation or virtual concatenation; or the GFP-T frame is directly mapped to an OTM-n frame using an Optical Channel Data Unit (ODU); and correspondingly, performing virtual concatenation buffering on the received STM-N/OTM-n frame.

10. The method for transmitting a plurality of antenna signals of claim 2, wherein
at the transmit end:
coding the in-band control signaling and forming a first GFP-T client data frame;
coding the digital wireless signal data stream and forming a second GFP-T client data frame;
GFP frame-level multiplexing the first GFP-T client data frame and the second GFP-T client data frame; and
at a receive end:
extracting the GEP frame from a received STM-N/OTM-n frame; and
demultiplexing the extracted GFP frame and decoding the first GFP-T client data frame and the second GFP-T client data frame as being demultiplexed respectively, to restore the in-band control signaling and the digital wireless signal data stream respectively.

11. The method for transmitting a plurality of antenna signals of claim 10, wherein the multiplexed GFP frame is firstly mapped to a Virtual Container (VC) and then to a STM-N frame by means of sequential concatenation or virtual concatenation; or the multiplexed GFP frame is directly mapped to an OTM-n frame using an Optical Channel Data Unit (ODU); and
correspondingly, performing virtual concatenation buffering on the received STM-N/OTM-n frame.

12. The method for transmitting a plurality of antenna signals of claim 2, wherein
at the transmit end:
forming the in-band control signaling into a GFP-F frame, wherein the GFP-F frame is the frame supporting Protocol Data Unit (PDU) as defined by Generic Framing Procedure;
coding the digital wireless signal data stream and forming the coded digital wireless signal data stream into a GFP-T frame;
GFP frame-level multiplexing the formed GFP-F frame and the formed GFP-T frame; and
at a receive end:
extracting the GFP frame from a received STM-N/OTM-n frame; and
demultiplexing the extracted GFP frame to separate the GFP-F frame and the GFP-T frame, so as to restore the in-band control signaling from the separated GFP-F frame, and decoding the separated GFP-T frame firstly, then restoring the digital wireless signal data stream.

13. The method for transmitting a plurality of antenna signals of claim 12, wherein the GFP frame is firstly mapped to a Virtual Container (VC) and then to a STM-N frame by means of sequential concatenation or virtual concatenation; or the GFP frame is directly mapped to an OTM-n frame using an Optical Channel Data Unit (ODU); and
correspondingly, performing virtual concatenation buffering on the received STM-N/OTM-n frame.

14. The method for transmitting a plurality of antenna signals of claim 1, wherein
at the transmit end:
the plurality of antennas transmit the plurality of signals using at least one of the following multi-antenna technologies: transmit diversity, receive diversity, Multiple-Input Multiple-Output, Smart Antenna or Antenna Array.

15. The method for transmitting a plurality of antenna signals of claim 1, wherein
at the transmit end:
coding using a 64B/65B code block; and
at a receive end:
decoding using the 64B/65B code block correspondingly.

16. A method for transmitting a plurality of antenna signals between a main Base Transceiver Station (BTS) and one or more Remote Radio Units (RRUs), wherein a transmit channel between the main BTS and the RRUs communicates using a wideband transmission link or a network, and at least one of said communicates the plurality of antenna signals with the main BTS over the transmit channel by using a plurality of antennas, the method comprising the steps of:
at a transmit end:
transmitting over the transmit channel using a Synchronous Digital Hierarchy (SDH)/Optical Transmission Network (OTN);
GFP frame-level multiplexing the plurality of antenna signals and an in-band control signaling stream over the transmit channel to form a Generic Framing Procedure (GFP) frame, and mapping the GFP Frame to a STM-N/OTM-n frame thereby multiplexing the plurality of antenna signals and the in-band control signaling stream to realize SDH/OTN-based transmission.

17. The method for transmitting a plurality of antenna signals of claim 16, wherein the method further includes:
at the transmit end:
coding the in-band control signaling stream and forming a first GFP-T client data frame;
performing parallel to serial conversion and coding processing respectively on various antenna signals synchronously to form a plurality of respective second GFP-T data frames, wherein the various antenna signals are synchronized in the processes of serial to parallel conversion, coding processing and GFP-T frame forming processing, and the structure sizes of various formed second GFP-T frames are the same;
GEP frame-level multiplexing the first GFP-T client data frame and the plurality of second GFP-T client data frames; and
at a receive end:
extracting the GFP frame from a received STM-N/OTM-n frame; and
demultiplexing the extracted GFP frame, and decoding the first GFP-T client data frame demultiplexed to restore the in-band control signaling, and decoding the plurality of second GFP-T client data frames demultiplexed, then performing serial to parallel conversion respectively to restore the various antenna signals of the transmit end respectively.

18. The method for transmitting a plurality of antenna signals of claim 17, wherein the multiplexed GFP frame is firstly mapped to a Virtual Container (VC) and then to a STM-N frame by means of sequential concatenation or virtual concatenation; or the multiplexed GFP frame is directly mapped to an OTM-n frame using an Optical Channel Data Unit (ODU); and
correspondingly, performing virtual concatenation buffering on the received STM-N/OTM-n frame.

19. The method for transmitting a plurality of antenna signals of claim 16, wherein the method further includes:
at the transmit end:
forming the in-band control signaling into a GFP-F frame, wherein the GFP-F frame is the frame supporting Protocol Data Unit (PDU) as defined by Generic Framing Procedure;

performing parallel to serial conversion and coding processing on various antenna signals respectively and synchronously to form a plurality of respective GFP-T data frames, wherein the various antenna signals are synchronized in the processes of parallel to serial conversion, coding processing and GFP-T frame forming processing, and the structure sizes of various formed GFP-T frames are the same;

GFP frame-level multiplexing the formed GFP-F frame and the plurality of formed GFP-T frames; and at a receive end:

extracting the GFP frame from a received STM-N/OTM-n frame; and demultiplexing the extracted GFP frame to separate the GFP-F frame and the plurality of respective GFP-T frames, so as to restore the in-band control signaling from the separated GFP-F frame, and decoding the plurality of separated GFP-T frames respectively, then restoring the various antenna signals of the transmit end respectively after respective serial to parallel conversion.

20. The method for transmitting a plurality of antenna signals of claim 19, wherein the multiplexed GFP frame is firstly mapped to a Virtual Container (VC) and then to a STM-N frame by means of sequential concatenation or virtual concatenation; or the multiplexed GFP frame is directly mapped to an OTM-n frame using an Optical Channel Data Unit (ODU); and correspondingly, performing virtual concatenation buffering on the received STM-N/OTM-n frame.

21. The method for transmitting a plurality of antenna signals of claim 16, wherein at the transmit end:

the plurality of antennas transmit the plurality of signals using at least one of the following multi-antenna technologies: transmit diversity, receive diversity, Multiple-Input Multiple-Output, Smart Antenna or Antenna Array.

22. The method for transmitting a plurality of antenna signals of claim 16, wherein at the transmit end:

coding using a 64B/65B code block; and at a receive end:

decoding using the 64B/65B code block correspondingly.

23. A method for transmitting a plurality of antenna signals between a main Base Transceiver Station (BTS) and one or more Remote Radio Units (RRUs), wherein a transmit channel between the main BTS and the RRUs communicates using a wideband transmission link or a network, and at least one of said RRUs communicates a plurality of antenna signals with the main BTS over the transmit channel by using a plurality of antennas, the method comprising the steps of:

at a transmit end:

transmitting over the transmit channel using a Synchronous Digital Hierarchy (SDH)/Optical Transmission Network (OTN);

forming the plurality of antenna signals and a plurality of respective control signaling on in-band control signaling channels into a plurality of respective Generic Framing Procedure (GFP) frames in parallel over the transmit channel, and mapping the GEP frames to a plurality of respective STM-N/OTM-n frames, so as to realize parallel transmission of the plurality of antenna signals based on SDH/OTN.

24. The method for transmitting a plurality of antenna signals of claim 23, wherein the method further includes:

at the transmit end:

performing parallel to serial conversion on each antenna signal of the plurality of antenna signals synchronously, and time division multiplexing each converted antenna signal and one corresponding data stream on respective in-band control signaling channel within one GFP frame;

coding the multiplexed GEP frames that are formed on various antenna branches synchronously to form a GFP-T frames respectively; and at a receive end:

separating each GFP-T frame from respective STM-N/OTM-n frame synchronously on each antenna branch;

performing GFP frame alignment processing based on serial number synchronously, so as to restore the Currently amended phase and time synchronization relations of wireless signals on various antenna branches;

decoding and demultiplexing the various GFP-T frames respectively and synchronously, as so to separate the data streams on the in-band control signaling channels corresponding to various antennas; and restoring various respective antenna signals from various demultiplexed antenna signals synchronously after serial to parallel conversion.

25. The method for transmitting a plurality of antenna signals of claim 24, wherein at the transmit end:

various multiplexed GFP-T frames on various antenna branches are firstly mapped to Virtual Containers (VCs) and then to STM-N frames by means of sequential concatenation or virtual concatenation; or the multiplexed GFP-T frames are directly mapped to OTM-n frames using Optical Channel Data Units (ODUs); and correspondingly, performing virtual concatenation buffering on various received STM-N/OTM-n frames.

26. The method for transmitting a plurality of antenna signals of claim 24, wherein, to ensure the synchronization of phase and time of the wireless signal transmission on the various antennas, the method further includes:

at the transmit end:

configuring time division multiplex within a GFP-T frame of the various antenna branches to be synchronous, that is, the divisions of time slots that transmit wireless signal data streams corresponding to the various antenna branches and the data streams on the respective in-band control signaling channels are the same; and performing parallel to serial conversion, coding processing and GFP-T frame forming processing on the various antenna signals synchronously, and configuring the structures and sizes of respective GFP-F frames to be the same.

27. The method for transmitting a plurality of antenna signals of claim 23, wherein the method further includes:

at the transmit end:

performing parallel to serial conversion and coding processing on each antenna signal of the plurality of antenna signals synchronously so as to form a plurality of first GFP-T frames;

coding data streams on the in-band control signaling channels corresponding to various antenna signals synchronously so as to form a plurality of second GFP-T frames;

GFP frame-level multiplexing the first GFP-T frames of various antenna branches and the second GFP-T frame formed thereon, so as to form a plurality of GFP frames corresponding to the antenna signals synchronously; and at a receive end:

separating respective GFP-T frames from respective STM-N/OTM-n frames on the various antenna branches;

performing GFP frame alignment processing based on serial number so as to restore the first GFP-T frames corresponding to various antenna branches and the second GFP-T frames on respective in-band control signaling channels;

decoding and performing serial to parallel conversion on various first GFP-T frames synchronously to restore various antenna signals on various antennas;

decocting and performing serial to parallel conversion on various second GFP-T frames synchronously to restore data streams on various in-band control signaling channel.

28. The method for transmitting a plurality of antenna signals of claim 27, wherein various multiplexed GFP frames on the various antennas branches are firstly mapped to Virtual Containers (VCs) and then to STM-N frames by means of sequential concatenation or virtual concatenation; or the multiplexed GFP frames are directly mapped to OTM-n frames using Optical Channel Data Units (ODUs); and correspondingly, performing virtual concatenation buffering on received STM-N/OTM-n frames.

29. The method for transmitting a plurality of antenna Signals of claim 27, wherein, to ensure the synchronization of the phase and time of wireless signal transmission on various antennas, the method further includes:

the parallel to serial conversion, coding processing and GFP-T frame forming processing performed on the antenna signals of the various antenna branches and the coding processing and GFP-T frame forming processing performed on the respective in-band control signaling channels are all synchronized; and adopting the manner of fixed bandwidth distributing and scheduling for the plurality of formed GFP frames, that is, a respective GFP-T frame of the in-band control signaling channel is transmitted when every N (N≧1) digital wireless signal GFP-T frames of certain antennas are transmitted, and if an input buffer corresponding to certain antenna branch is null, it is padded with padding character; and configuring the bandwidth distributing manner of various GFP frames multiplex, the structures and sizes of the GFP-T frame to be the same so as to ensure synchronization transmission.

30. The method for transmitting a plurality of antenna signals of claim 23, wherein, to realize the synchronization of transmitting GFP-T frames corresponding to various antenna branches, the method further includes defining a new GFP extension header, wherein:

at the transmit end:

defining a new payload header Extension Header Identifier (EXI) field using a reserved field;

thereby a GFP frame extension header includes: a channel identifier (CID) of 8 bits, a serial number of 16 bits, and extension header error control field (eHEC).

31. The method for transmitting a plurality of antenna signals of claim 30, wherein the CID is used to identify the GFP-T frames corresponding to different antenna branches; and a serial number field is used to count the number of the GFP frames on the same channel, that is, to cycle count each GFP frame on the channel sequentially using addition or subtraction, the serial number field is then used to transmit the serial number corresponding to each GFP frame.

32. The method for transmitting a plurality of antenna signals of claim 23, wherein at the transmit end:

the plurality of antennas transmit the plurality of signals using at least one of the following multi-antenna technologies: transmit diversity, receive diversity; Multiple-Input Multiple-Output, Smart Antenna or Antenna Array.

33. The method for transmitting a plurality of antenna signals of claim 23, wherein at the transmit end:

coding using a 64B/65B code block; and at a receive end:

decoding using the 64B/65B code block correspondingly.

34. The method for transmitting a plurality of antenna signals of claim 23, wherein the in-band control signaling channel is configured adopting at least one of the following manners:

at the transmit end:

in-band control signaling packets are transmitted independently through corresponding in-band control signaling channels of each branch, so that the in-band control signaling channels are equal to a plurality of independent in-band control signaling channels for Upper Layer Protocol;

data streams corresponding to various channels are converged to one data stream by means of transmission layer synchronization, so that the in-band control signaling channels are one in-band control signaling transmit channel for Upper Layer Protocol; and the in-band control signaling channels provide a single logic link for Upper Layer Protocol using link layer protocols having the function of logic link inverse multiplexing, the link layer protocols selected from Multilink PPP, IEEE 802.3ad Link Aggregation Control Protocol and Inverse Multiplex ATM (IMA) Protocol, without the requirement for transmission layer synchronization.

35. A BTS communication system for transmitting a plurality of antenna signals between a main Base Transceiver Station (BTS) and one or more Remote Radio Units (RRUs), wherein a transmit channel between the main BTS and the one or more RRUs communicates using a wideband transmission link or a network, and at least one of said RRUs communicates a plurality of antenna signals with the main BTS over the transmit channel by using a plurality of antennas, the BTS communication system at least comprising:

a Synchronous Digital Hierarchy (SDH)/Optical Transmission Network (OTN) communication interface configured on the transmit channel, for multiplexing the plurality of antenna signals over the transmit channel adopting time division multiplex technology; and forming a multiplexed antenna signals stream and in-band control signaling stream into a Generic Framing Procedure (GFP) frame, and further mapping the GFP frame to a STM-N/OTM-n frame, so as to multiplex the plurality of antenna signals and the in-band control signaling stream to realize SDH/OTN-based transmission.

36. The BTS communication system of claim 35, wherein the system further includes:

a plurality of parallel to serial converters corresponding to the plurality of antenna signals, for performing parallel to serial conversion on the plurality of antenna signals respectively; and a time division multiplexer for forming the plurality of antenna signals converted into one digital wireless signal data stream using isochronous slot time division multiplex technology within one GFP-T frame, wherein the operation of isochronous slot time division multiplexing the plurality of antenna signals within one GFP-T frame refers to dividing a client signal data block transmitted by each GFP-T frame with fixed length into M time slots with equal size, and distributing the time slots to various antenna branches to transmit the digital wireless signal stream thereof, wherein M is the number of antenna branches, and the GFP-T frame is the frame supporting block code as defined by Generic Framing Procedure.

37. A BTS communication system for transmitting a plurality of antenna signals between a main Base Transceiver Station (BTS) and one or more Remote Radio Units (RRUs), wherein a transmit channel between the main BTS and the RRUs communicates using a wideband transmission link or a network, and at least one of said RRUs communicates the plurality of antenna signals with the main BTS over the transmit channel by using a plurality of antennas, the BTS communication system at least comprising:

a Synchronous Digital Hierarchy (SDH)/Optical Transmission Network (OTN) communication interface configured on the transmit channel, for forming the plurality of antenna signals and an in-band control signaling stream into a Generic Framing Procedure (GFP) frame over the transmit channel adopting GFP frame level multiplex, and further to map the GFP frame to a STM-N/OTM-n frame, so as to multiplex the plurality of antenna signals and the in-band control signaling stream to realize the transmission based on SDH/OTN.

38. A BTS communication system for transmitting a plurality of antenna signals between a main Base Transceiver Station (BTS) and one or more Remote Radio Units (RRUs), wherein a transmit channel between the main BTS and the RRUs communicates using a wideband transmission link or a network, and at least one of said RUUs communicates the plurality of antenna signals with the main BTS over the transmit channel by using a plurality of antennas, the BTS communication system at least comprising:

a Synchronous Digital Hierarchy (SDH)/Optical Transmission Network (OTN) communication interface, configured on the transmit channel, for forming the plurality of antenna signals and a plurality of respective control signaling on in-band control signaling channels into a plurality of respective Generic Framing Procedure (GFP) frames in parallel, and for mapping the GFP frames to a plurality of respective STM-N/OTM-n frames, to realize parallel transmission of the plurality of antenna signals based on SDH/OTN.

* * * * *